(12) United States Patent
Lin et al.

(10) Patent No.: US 11,803,055 B2
(45) Date of Patent: *Oct. 31, 2023

(54) SEDENTARY VIRTUAL REALITY METHOD AND SYSTEMS

(71) Applicant: Connectivity Labs Inc., Cupertino, CA (US)

(72) Inventors: Rocky Chau-Hsiung Lin, Cupertino, CA (US); Koichiro Kanda, San Jose, CA (US); Thomas Yamasaki, Anaheim Hills, CA (US)

(73) Assignee: Connectivity Labs Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/479,479

(22) Filed: Sep. 20, 2021

(65) Prior Publication Data

US 2022/0004000 A1    Jan. 6, 2022

Related U.S. Application Data

(63) Continuation of application No. 16/505,471, filed on Jul. 8, 2019, now Pat. No. 11,125,996, which is a
(Continued)

(51) Int. Cl.
*G02B 27/01* (2006.01)
*G06F 3/0346* (2013.01)
(Continued)

(52) U.S. Cl.
CPC ............ *G02B 27/017* (2013.01); *G06F 3/011* (2013.01); *G06F 3/0346* (2013.01); *G06F 3/147* (2013.01);
(Continued)

(58) Field of Classification Search
CPC .. G06F 3/0481; G06F 3/04817; G06F 9/4443; G06F 3/04847; G06F 11/3664;
(Continued)

(56) References Cited

U.S. PATENT DOCUMENTS 5,003,300 A    3/1991  Wells
5,632,742 A    5/1997  Frey et al.
(Continued)

FOREIGN PATENT DOCUMENTS

DE    10047237    4/2002
DE    10103922    8/2002
(Continued)

*Primary Examiner* — Todd Buttram
(74) *Attorney, Agent, or Firm* — Perkins Coie LLP

(57) ABSTRACT

Method and devices for creating a sedentary virtual-reality system are provided. A user interface is provided that allows for the intuitive navigation of the sedentary virtual-reality system based on the position of the users head. The sedentary virtual-reality system can render a desktop computing environment. The user can switch the virtual-reality system into an augmented reality viewing mode or a real-world viewing mode that allow the user to control and manipulate the rendered sedentary environment. The modes can also change to allow the user greater situational awareness and a longer duration of use.

20 Claims, 16 Drawing Sheets

Related U.S. Application Data continuation of application No. 15/783,217, filed on Oct. 13, 2017, now Pat. No. 10,345,588, which is a continuation of application No. 15/048,205, filed on Feb. 19, 2016, now Pat. No. 9,804,394, which is a continuation of application No. 14/850,843, filed on Sep. 10, 2015, now Pat. No. 9,298,283.

(51) Int. Cl.
  *G06F 3/14* (2006.01)
  *G06F 3/147* (2006.01)
  *G06F 3/01* (2006.01)

(52) U.S. Cl.
  CPC ....... *G06F 3/1423* (2013.01); *G09G 2340/10* (2013.01)

(58) Field of Classification Search
  CPC ........ G06F 3/011; G06F 3/012; G06F 3/0304; G06T 19/00; G06T 19/006; G06T 17/00; H04N 5/272; A63F 13/10
  See application file for complete search history.

(56) References Cited

U.S. PATENT DOCUMENTS

| | | |
|---|---|---|
| 5,977,935 A | 11/1999 | Yasukawa et al. |
| 6,046,712 A | 4/2000 | Beller et al. |
| 6,101,038 A | 8/2000 | Hebert et al. |
| 6,320,559 B1 | 11/2001 | Yasukawa et al. |
| 6,323,846 B1 | 11/2001 | Westerman et al. |
| 6,450,639 B1 | 9/2002 | Abraham |
| 6,480,174 B1 | 11/2002 | Kaufmann et al. |
| 6,611,653 B1 | 8/2003 | Kim et al. |
| 6,760,772 B2 | 7/2004 | Zou et al. |
| 7,245,273 B2 | 7/2007 | Eberl et al. |
| 7,530,019 B2 | 5/2009 | Kjeldsen et al. |
| 7,595,933 B2 | 9/2009 | Tang |
| 8,183,997 B1 | 5/2012 | Wong et al. |
| 8,184,067 B1 | 5/2012 | Braun et al. |
| 8,184,070 B1 | 5/2012 | Taubman |
| 8,190,749 B1 | 5/2012 | Chi et al. |
| 8,203,502 B1 | 6/2012 | Chi et al. |
| 8,217,856 B1 | 7/2012 | Petrou |
| 8,275,893 B1 | 9/2012 | Chi et al. |
| 8,353,594 B2 | 1/2013 | Lewis |
| 8,384,617 B2 | 2/2013 | Braun et al. |
| 8,390,533 B2 | 3/2013 | Yamamoto |
| 8,482,527 B1 | 7/2013 | Kim |
| 8,493,204 B2 | 7/2013 | Wong et al. |
| 8,594,338 B2 | 11/2013 | Sinivaara |
| 8,666,455 B2 | 3/2014 | Song |
| 8,686,924 B2 | 4/2014 | Braun et al. |
| 8,696,113 B2 | 4/2014 | Lewis |
| 8,733,927 B1 | 5/2014 | Lewis |
| 8,733,928 B1 | 5/2014 | Lewis |
| 8,736,516 B2 | 5/2014 | Jacobsen et al. |
| 8,754,931 B2 | 6/2014 | Gassel et al. |
| 8,767,305 B2 | 7/2014 | Spitzer et al. |
| 8,786,520 B2 | 7/2014 | Legerton et al. |
| 8,836,771 B2 | 9/2014 | Strong |
| 8,874,760 B2 | 10/2014 | Chi et al. |
| 8,907,867 B2 | 12/2014 | Wong et al. |
| 8,928,558 B2 | 1/2015 | Lewis et al. |
| 8,952,869 B1 | 2/2015 | Weaver et al. |
| 8,957,835 B2 | 2/2015 | Hoellwarth |
| 8,970,960 B2 | 3/2015 | Yu |
| 8,977,205 B2 | 3/2015 | Tricoukes et al. |
| 8,979,398 B2 | 3/2015 | Han et al. |
| 8,988,463 B2 | 3/2015 | Stone Perez et al. |
| 9,010,929 B2 | 4/2015 | Lewis |
| 9,013,793 B2 | 4/2015 | Gupta et al. |
| 9,019,174 B2 | 4/2015 | Jerauld |
| 9,024,843 B2 | 5/2015 | Heinrich et al. |
| 9,025,252 B2 | 5/2015 | Lewis et al. |
| 9,057,826 B2 | 6/2015 | Gupta et al. |
| 9,066,007 B2 | 6/2015 | Chau et al. |
| 9,069,115 B2 | 6/2015 | Gupta et al. |
| 9,087,471 B2 | 7/2015 | Miao |
| 9,091,852 B2 | 7/2015 | Olsson et al. |
| 9,092,954 B2 | 7/2015 | Visitacion et al. |
| 9,110,504 B2 | 8/2015 | Lewis et al. |
| 9,116,545 B1 | 8/2015 | Raffle et al. |
| 9,122,321 B2 | 9/2015 | Perez et al. |
| 9,152,378 B2 | 10/2015 | Jacobsen et al. |
| 9,153,074 B2 | 10/2015 | Zhou et al. |
| 9,153,195 B2 | 10/2015 | Geisner et al. |
| 9,158,389 B1 | 10/2015 | Sharma |
| 9,158,839 B2 | 10/2015 | Sharma et al. |
| 9,298,283 B1 | 3/2016 | Lin et al. |
| 9,804,394 B2 | 10/2017 | Lin et al. |
| 11,125,996 B2 * | 9/2021 | Lin .......... G06F 3/147 |
| 2002/0082879 A1 | 6/2002 | Miller et al. |
| 2002/0101568 A1 | 8/2002 | Eberl et al. |
| 2005/0278750 A1 | 12/2005 | Grossman et al. |
| 2006/0061555 A1 | 3/2006 | Mullen |
| 2006/0119576 A1 | 6/2006 | Richardson et al. |
| 2007/0162853 A1 | 7/2007 | Weber et al. |
| 2007/0201737 A1 | 8/2007 | Cai |
| 2007/0237491 A1 | 10/2007 | Kraft |
| 2008/0088529 A1 | 4/2008 | Tang |
| 2008/0088936 A1 | 4/2008 | Tang et al. |
| 2008/0088937 A1 | 4/2008 | Tang |
| 2008/0249895 A1 | 10/2008 | Mariotti |
| 2008/0255889 A1 | 10/2008 | Geisler et al. |
| 2008/0276178 A1 | 11/2008 | Fadell et al. |
| 2008/0276196 A1 | 11/2008 | Tang |
| 2009/0128448 A1 | 5/2009 | Riechel |
| 2010/0325206 A1 | 12/2010 | Dayal |
| 2010/0331721 A1 | 12/2010 | Epley |
| 2011/0090135 A1 | 4/2011 | Tricoukes et al. |
| 2011/0157180 A1 | 6/2011 | Burger et al. |
| 2012/0056896 A1 | 3/2012 | Border |
| 2012/0064951 A1 | 3/2012 | Agevik et al. |
| 2012/0235902 A1 | 9/2012 | Eisenhardt et al. |
| 2012/0242560 A1 | 9/2012 | Nakada et al. |
| 2012/0249587 A1 | 10/2012 | Anderson et al. |
| 2013/0002724 A1 | 1/2013 | Heinrich et al. |
| 2013/0002813 A1 | 1/2013 | Vaught et al. |
| 2013/0141313 A1 | 6/2013 | Zhou et al. |
| 2013/0141360 A1 | 6/2013 | Compton et al. |
| 2013/0169683 A1 | 7/2013 | Perez et al. |
| 2013/0181888 A1 | 7/2013 | Kuriya et al. |
| 2013/0201305 A1 | 8/2013 | Sibecas et al. |
| 2013/0201308 A1 | 8/2013 | Tan et al. |
| 2013/0249778 A1 | 9/2013 | Morimoto |
| 2013/0293580 A1 | 11/2013 | Spivack |
| 2013/0293723 A1 | 11/2013 | Benson et al. |
| 2013/0335321 A1 | 12/2013 | Sugita et al. |
| 2014/0118225 A1 | 5/2014 | Jerauld |
| 2014/0118631 A1 | 5/2014 | Cho |
| 2014/0192092 A1 | 7/2014 | Aruga et al. |
| 2014/0247278 A1 | 9/2014 | Samara |
| 2014/0268008 A1 | 9/2014 | Howell et al. |
| 2015/0009309 A1 | 1/2015 | Heinrich et al. |
| 2015/0049018 A1 | 2/2015 | Gomez |
| 2015/0109338 A1 | 4/2015 | McKinnon |
| 2015/0138417 A1 | 5/2015 | Ratcliff |
| 2015/0234193 A1 | 8/2015 | Lyons |
| 2015/0242993 A1 | 8/2015 | Raman |
| 2015/0277638 A1 | 10/2015 | Bustamante |
| 2017/0075117 A1 | 3/2017 | Lin |
| 2018/0039079 A1 | 2/2018 | Lin |
| 2020/0159017 A1 * | 5/2020 | Lin .......... G06F 3/147 |
| 2022/0004000 A1 * | 1/2022 | Lin .......... G06F 3/011 |

FOREIGN PATENT DOCUMENTS

| | | |
|---|---|---|
| DE | 102014009745 | 9/2015 |
| EP | 2605056 | 6/2013 |
| EP | 2674850 | 12/2013 |
| EP | 2860697 | 4/2015 |
| GB | 2501768 | 11/2013 |
| GB | 2516242 | 1/2015 |

(56) References Cited

FOREIGN PATENT DOCUMENTS

| WO | 2002031577 | 4/2002 |
|---|---|---|
| WO | 2002031578 | 4/2002 |
| WO | 2002031580 | 4/2002 |
| WO | 2002033472 | 4/2002 |
| WO | 2012040030 | 3/2012 |
| WO | 2012078766 | 6/2012 |
| WO | 2012138631 | 10/2012 |
| WO | 2014057275 | 4/2014 |
| WO | 2014108693 | 7/2014 |
| WO | 2014181017 | 11/2014 |
| WO | 2014197338 | 12/2014 |
| WO | 2014199154 | 12/2014 |
| WO | 2015034453 | 3/2015 |
| WO | 2015076531 | 5/2015 |
| WO | 2015092968 | 6/2015 |
| WO | 2015099215 | 7/2015 |
| WO | 2015099216 | 7/2015 |
| WO | 2015108234 | 7/2015 |
| WO | 2015119525 | 8/2015 |
| WO | 2015134733 | 9/2015 |

\* cited by examiner

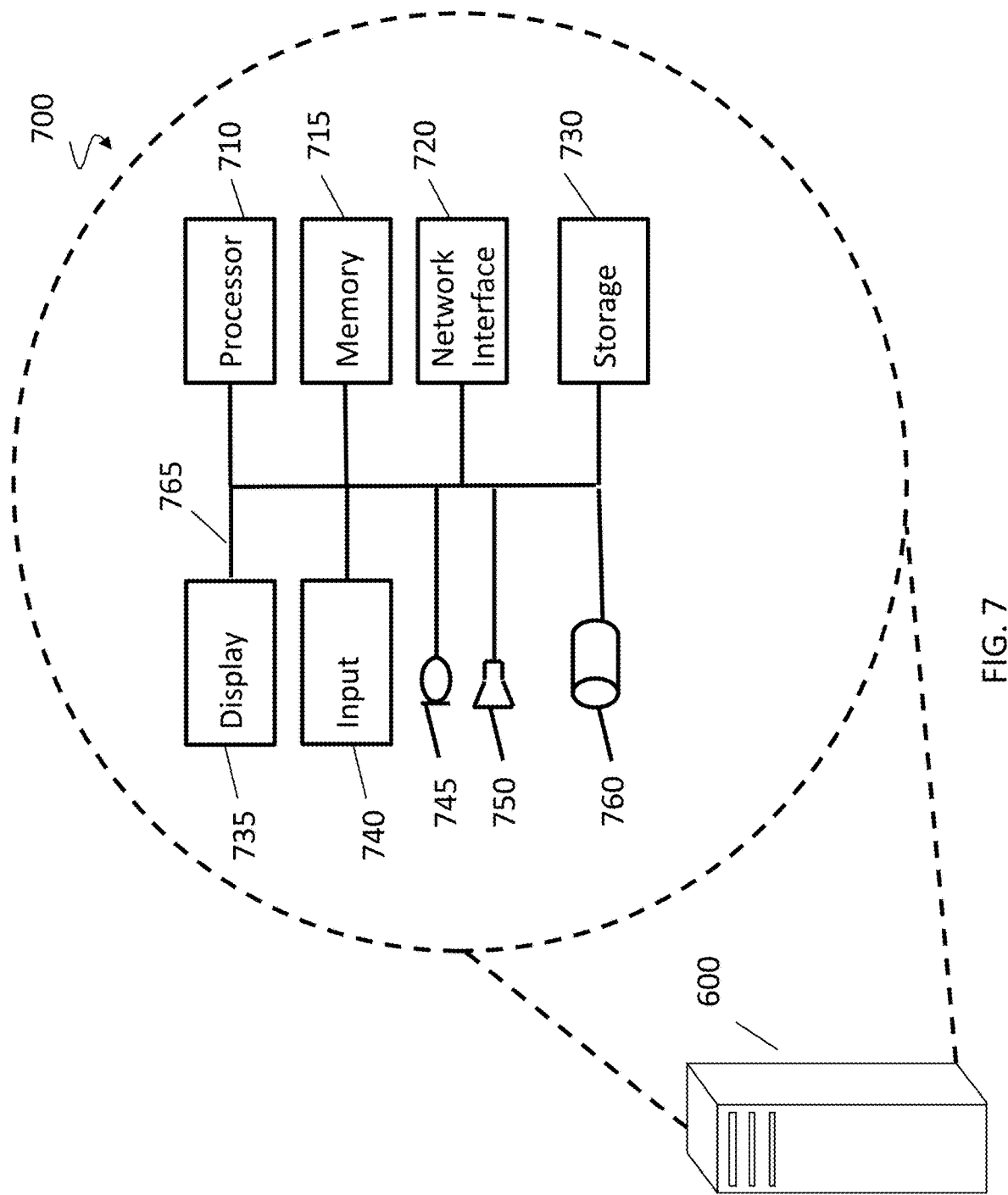

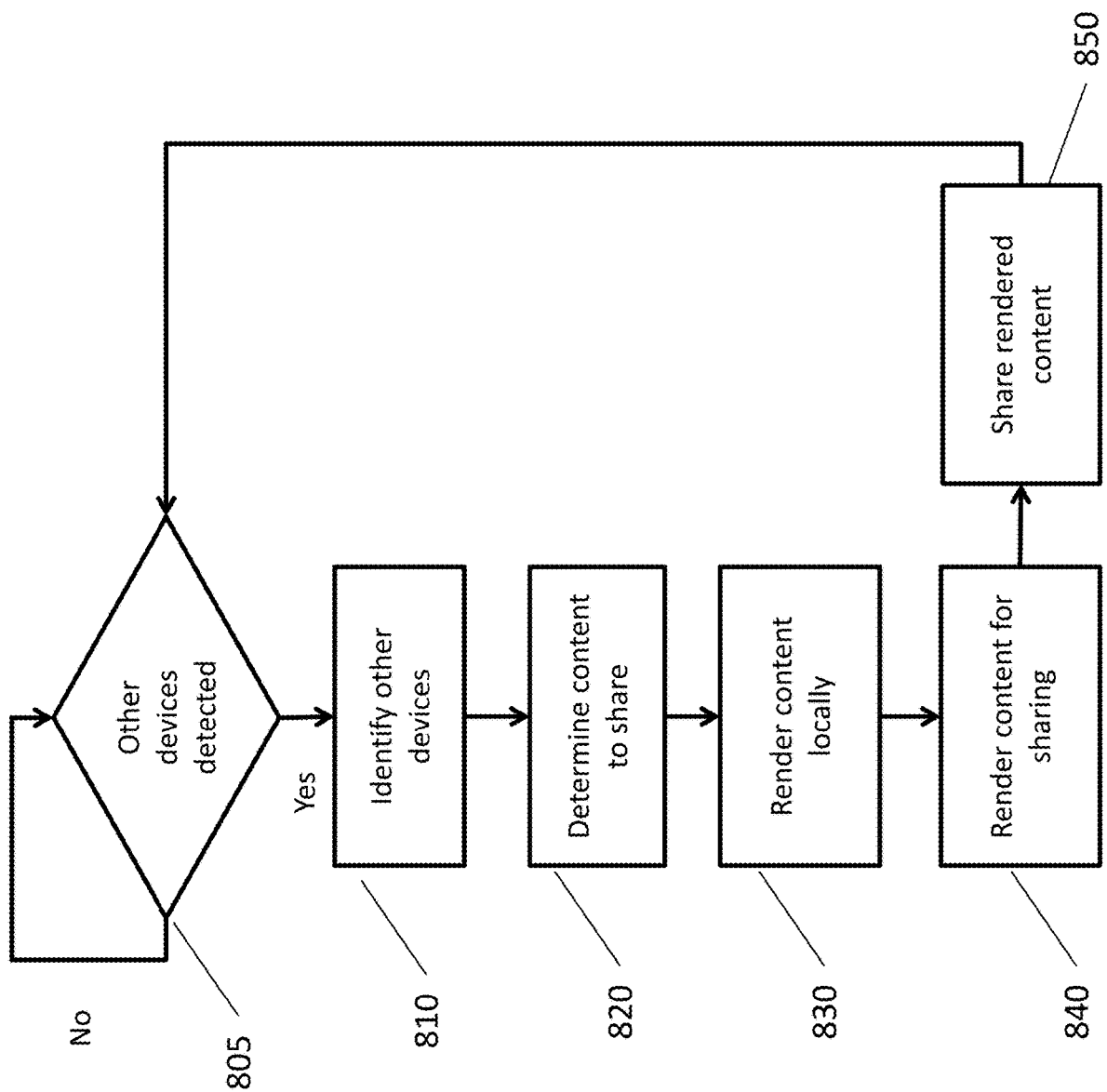

SEDENTARY VIRTUAL REALITY METHOD AND SYSTEMS

CROSS REFERENCE TO RELATED APPLICATION

This application is a continuation of U.S. patent application Ser. No. 16/505,471 filed Jul. 8, 2019, entitled "SEDENTARY VIRTUAL REALITY METHOD AND SYSTEMS," which is a continuation of U.S. patent application Ser. No. 15/783,217 filed Oct. 13, 2017, now U.S. Pat. No. 10,345,588, entitled "SEDENTARY VIRTUAL REALITY METHOD AND SYSTEMS," which is a continuation of U.S. patent application Ser. No. 15/048,205, filed on Feb. 19, 2016, now U.S. Pat. No. 9,804,394, entitled "SEDENTARY VIRTUAL REALITY METHOD AND SYSTEMS," which is a continuation of U.S. patent application Ser. No. 14/850,843, filed on Sep. 10, 2015, now U.S. Pat. No. 9,298,283, entitled "SEDENTARY VIRTUAL REALITY METHOD AND SYSTEMS." The entire contents of the aforementioned patent applications are incorporated by reference as part of the disclosure of this application.

TECHNICAL FIELD

The present invention is directed to improving the user experience of virtual reality systems when recreating sedentary environments by providing environmental queues and control mechanisms.

BACKGROUND

Virtual reality systems have traditionally been designed to recreate dynamic, moving environments such as virtual, three-dimensional worlds. Virtual-reality systems have often relied on immersive, head-mounted displays to provide information to users. While providing an immersive environment appropriate for a virtual world, such head-mounted displays deprive a usual of real-world context, information, and control devices. Some users of such head-mounted displays often express discomfort during extended use and thus cannot use them for an extended duration or in particular environments. Such limited-duration use can deprive a user of the benefits of head-mounted displays and reduce their productivity.

Head mounted display systems that use mobile devices as the display apparatus have come into use. Such devices typically have lower resolution and frame rates that increase the users discomfort and reduces productivity.

SUMMARY

The present inventors recognized that user discomfort in virtual-reality systems can be caused by mismatches of motion (reality) to perceived environment (virtual), insufficient refresh rate of the rendering or display technology to keep pace with the displayed motion, and current systems do not allow a user to quickly see what is happening around them in the real world. The present inventors recognized the need to create virtual-reality systems that allow a user to increase their duration of use by providing real-world environmental queues and control mechanisms while recreating a sedentary virtual world.

Various implementations of the subject matter described herein may provide one or more of the following advantages. In one or more implementations, the techniques and apparatus described herein can enhance the virtual reality experience for use in recreating sedentary environments. By providing real-world environmental queues and control mechanisms, various implementations of the subject matter herein allow for an enhanced, recreated sedentary environment.

In general, in one aspect, the techniques can be implemented to include a device for creating a sedentary virtual-reality system, comprising: a display with a plurality of pixels; a mounting apparatus configured to attach the display to a user's head and position the display in front of a user's eyes; a position sensor capable of detecting an angle of use of the display; a camera capable of capturing live images; a memory component capable of storing electronic information; one or more computer processors, communicatively coupled to the display, memory component, and camera, and configured to analyze a default angle of the device and a first angle of the device and determine a first viewing mode for using the device; wherein the first viewing mode is a virtual-reality viewing mode and the one or more processors render three monitors that are displayed on the display when in the virtual-reality viewing mode.

Further, the techniques can be implemented such that the one or more computer processors, communicatively coupled to the display, memory component, and camera, are further configured to analyze a second angle of the device and determine a second viewing mode for using the device; and the second viewing mode is an augmented-reality viewing mode and the one or more processors render two or fewer monitors that are displayed on the display when in the augmented-reality viewing mode and one or more images captured by the camera.

Further, the techniques can be implemented such that the one or more computer processors, communicatively coupled to the display, memory component, and camera, are further configured to analyze a third angle of the device and determine a third viewing mode for using the device; and the third viewing mode is a real-world mode and the and the one or more processors render one or more images captured from the camera that are displayed on the display when in real-world mode.

Further, the techniques can be implemented such that the one or more computer processors, communicatively coupled to the display, memory component, and camera, are further configured to analyze a second and third angle of the device and determine a second and third viewing mode for using the device; the second viewing mode is an augmented-reality viewing mode and the one or more processors render two or fewer monitors when in the virtual-reality viewing mode; and the third viewing mode is a real-world mode and the one or more processors render one or more images captured by the camera.

Further, the techniques can be implemented such that the second viewing angle is one to ten degrees less than the first viewing angle; the third viewing angle is one to fifteen degrees less than the second viewing angle; and the fourth viewing angle is one degree less than the third viewing angle. Further, the techniques can be implemented to further comprise a networking interface communicatively coupled to the one or more computer processors; and such that the one or more computer processors has determined the second or third viewing mode for using the device; and the one or more computer processors, communicatively coupled to the display, memory component, and camera, are further configured to perform radio frequency detection, and connect with an input device through the networking interface when the input device is detected by the one or more computer processors.

Further, the techniques can be implemented to further comprise a networking interface communicatively coupled to the one or more computer processors; such that the one or more computer processors has determined the second or third viewing mode for using the device; and the one or more computer processors, communicatively coupled to the display, memory component, and camera, are further configured to analyze one or more images captured by the camera and perform computer vision detection on the one or more images captured by the camera, and connect with an input device through the networking interface when the input device is detected by the one or more computer processors.

Further, the techniques can be implemented to further comprise a networking interface communicatively coupled to the one or more computer processors; such that the one or more computer processors has determined the second or third viewing mode for using the device; and the one or more computer processors, communicatively coupled to the display, memory component, and camera, are further configured to analyze one or more images captured by the camera and perform optical character recognition detection on the one or more images captured by the camera, and connect with an input device through the networking interface when the input device is detected by the one or more computer processors.

Further, the techniques can be implemented such that the display, the position sensor, the camera, the memory component, and the one or more computer processors are contained within a mobile device. Further, the techniques can be implemented such that the position sensor, the camera, the memory component, and the one or more computer processors are contained within a mobile device; and the camera is positioned on the edge of the mobile device such that the camera can face down when the display is positioned in front of a user's eyes. Further, the techniques can be implemented such that the display, the position sensor, and the camera are contained within a headset. Further, the techniques can be implemented to further comprise a networking interface communicatively coupled to the one or more computer processors; such that the one or more computer processors, communicatively coupled to the display, memory component, and camera, are further configured to detect other devices capable of sharing content; and the one or more computer processors, communicatively coupled to the display, memory component, and camera, are further configured the processor is further configured to render the virtual-reality content to share with the other devices capable of sharing.

Further, the techniques can be implemented such that the display is partitioned into a left-eye viewing area and a right-eye viewing area that each display different images. Further, the techniques can be implemented such that the first, default angle of the device can be set by a user when the user is lying down.

In general, in another aspect, the techniques can be implemented to include Further, the techniques can be implemented such that a device for creating a sedentary virtual-reality system, comprising: a display with a plurality of pixels; a position sensor capable of detecting an angle of use of the display; a camera capable of capturing live images; a memory component capable of storing electronic information; a networking interface capable of wirelessly communicating with other devices; one or more computer processors, communicatively coupled to the display, position sensor, cameras, memory component, and networking interface; wherein the display, position sensor, camera, memory component, networking interface, and one or more computer processors are contained within a mobile device; a mounting apparatus configured to hold the mobile device position the display in front of a user's eyes; wherein, the one or more computer processors are configured to analyze angle of use of the display information received from the position sensor, and determine if the angle is between a first angle range, second angle range, or third angle range; wherein the first angle range corresponds to a virtual-reality viewing mode and the one or more processors render three monitors that are displayed on the display when in the virtual-reality viewing mode; wherein the second angle range corresponds to an augmented-reality viewing mode and the one or more processors render two or fewer monitors when in the virtual-reality viewing mode; and wherein the third angle range corresponds to a real-world viewing mode and the one or more processors render one or more images captured by the camera in the real-world viewing mode.

Further, the techniques can be implemented such that one or more computer processors, communicatively coupled to the display, position sensor, cameras, memory component, and networking interface are further configured to analyze one or more images captured by the camera and perform computer vision detection or optical character recognition detection and connect with an input device through the networking interface when the input device is detected by the one or more computer processors. Further, the techniques can be implemented such that one or more computer processors, communicatively coupled to the display, position sensor, cameras, memory component, and networking interface are further configured to perform radio frequency detection, and connect with an input device through the networking interface when the input device is detected by the one or more computer processors.

Further, the techniques can be implemented such that the display is partitioned into a left-eye viewing area and a right-eye viewing area that each display different images. Further, the techniques can be implemented such that the first angle range is zero to ten degrees below a default angle; the second angle range is eleven to fifteen degrees below the default angle; and the third angle range is sixteen to forty degrees below the default angle. Further, the techniques can be implemented such that the default angle of the device can be set by a user when the user is lying down.

These general and specific techniques can be implemented using an apparatus, a method, a system, or any combination of apparatuses, methods, and systems. The details of one or more implementations are set forth in the accompanying drawings and the description below. Further features, aspects, and advantages will become apparent from the description, the drawings, and the claims.

BRIEF DESCRIPTION OF THE DRAWINGS

FIG. 7 shows a block diagram of a server capable of creating a social environment for a sedentary virtual-reality system.

FIG. 8 shows steps for using a sedentary virtual-reality system in a sharing environment.

Like reference symbols indicate like elements throughout the specification and drawings.

DETAILED DESCRIPTION

Figure 1:
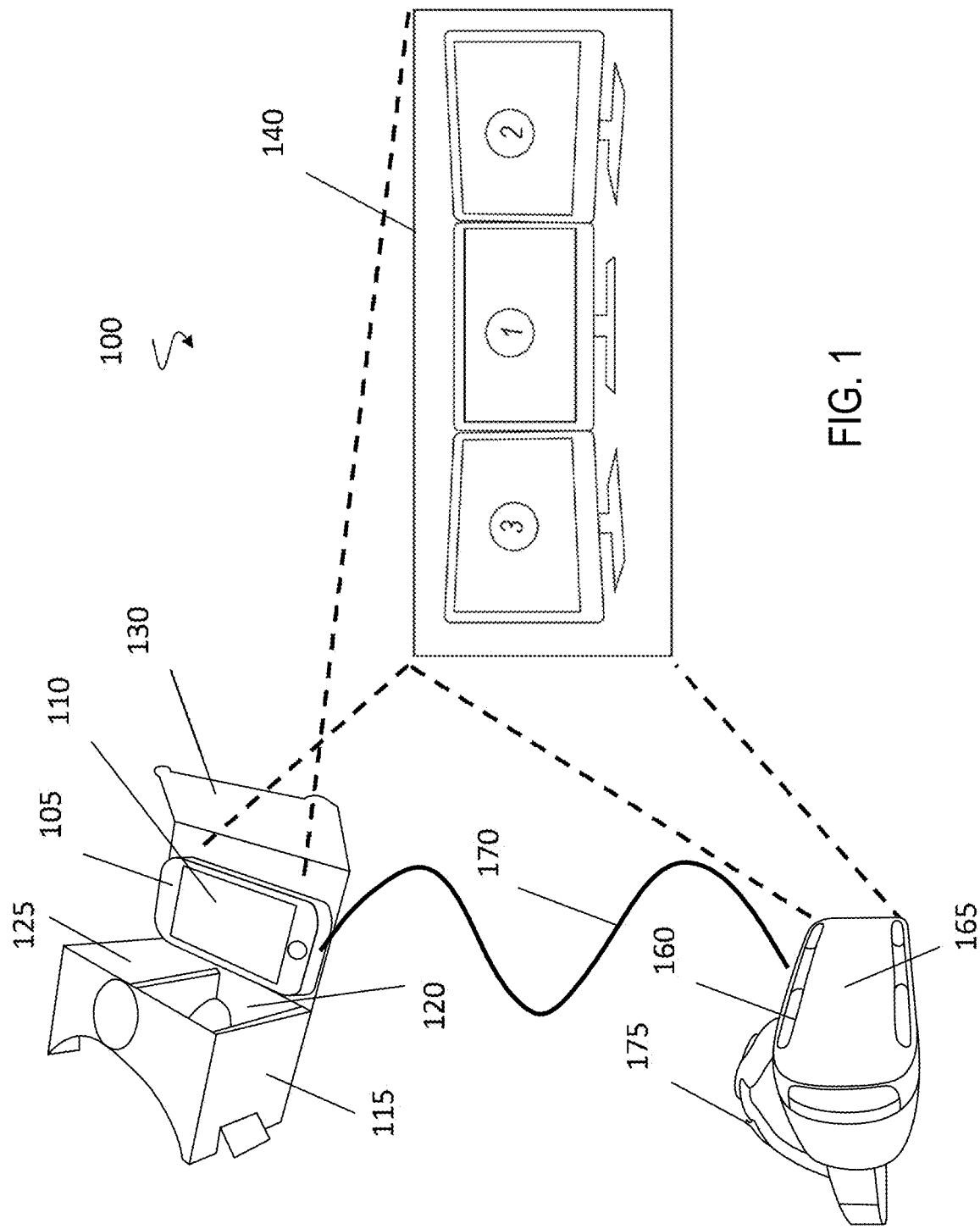
FIG. 1 shows virtual reality headsets in a user environment.

This invention generally relates to head-mounted display systems that recreate sedentary environments that allow a user to increase their use and also allow the user to maintain situational awareness. FIG. 1 shows virtual reality headsets in a user environment. User environment 100 contains a mobile device 105. Mobile device 105 incorporates display 110. Mobile device 105 rests on lid 130 of headset 115. Headset 115 can allow mobile device 105, which is typically hand-held, to be head mounted. Headset 115 also contains right-eye viewer 120 and left-eye viewer 125. Headset 115 can allow mobile device 105 to be used in a virtual-reality environment. Lid 130 can fold up such that display 110 of mobile device 105 sits adjacent to right-eye viewer 120 and left-eye viewer 125. Headset 115 can be positioned onto the face of a user such that the user sees through right-eye viewer 120 with the user's right eye and through the left-eye viewer 125 with the user's left eye. For human vision, the ideal resolution would be 126,000×6,000 to achieve a full immersive field of view of 210 degrees wide by 100 degrees. Each degree would need 60 pixels to replicate human vision capabilities. Display 110 can be partitioned into a left-eye viewing area and a right-eye viewing area that correspond to left-eye viewer 125 and right-eye viewer 120 to create a three-dimensional virtual world. Display 110 can display sedentary environment display 140, which can show a desktop with three monitors. Mobile device 105 can connect to other computers, including the Internet, to obtain content or interact with other devices.

A traditional headset, such as headset 160 can also be used. Traditional headset 160 can include headband 175. Traditional headset 160 can include display 165. Traditional headset can include hardware and software similar to a mobile device or computer to allow headset 160 to stand alone and generate its own content. Or headset 160 can connect to a computer or mobile device, such as mobile device 105. The connection can be through a cable, such as cable 170, or wireless. The connection can allow headset 160 to use the computer or mobile device to obtain content and interact with other devices.

Head-mounted mobile device 105 and/or headset 160 can create a constrained use case that presents sedentary-based virtual reality experiences. For example, the sedentary experiences can include sedentary productivity and media consumption experiences that reflect common real world uses for traditional displays that are generally not found in virtual reality technology. Head-mounted mobile device 105 and/or headset 160 can be used to expand the visual workspace by utilizing virtual-reality technology. By bringing the display closer to the user, the resolution of the display and perceived size are enhanced, allowing a user to see and thus process more information. Head-mounted mobile device 105 and/or headset 160 can create virtual desktops with multiple monitor setups. For example, a user is able to view the equivalent of multiple large-screen monitors on sedentary environment display 140 through head-mounted mobile device 105 and/or headset 160, and the user is able to experience desktop experiences on these monitors. Monitor configuration(s) can be changed for different work types, including word processing, cad, spreadsheet, or internet browsing.

Head-mounted mobile device 105 and/or headset 160 can provide a solitary work environment amidst a public location such as planes, trains, coffee shops, or other public places. Similarly, head-mounted mobile device 105 and/or headset 160 can reduce visual distractions to a user working in a public place by limiting the user's peripheral vision. In addition, mobile device 105 and/or headset 160 can include headphones (not depicted) that cancel ambient noise and reduce distraction from the surrounding environment. Head-mounted mobile device 105 and/or headset 160 can allow a user to maintain the confidentiality of data while allowing a user to work in public by preventing observers from peering over the user's shoulder in public. Head-mounted mobile device 105 and/or headset 160 can allow a user to view private information as well. Head-mounted mobile device 105 and/or headset 160 can also allow a user to share information with other users in a confidential nature, including shared viewing of content or collaborate work on documents and data. Users can connect through social networks or business networks on such collaborate and shared experiences.

Head-mounted mobile device 105 and/or headset 160 can also increase the portability of a user's computing equipment by allowing a user to work without the need for bulky computer equipment.

Figure 2A:
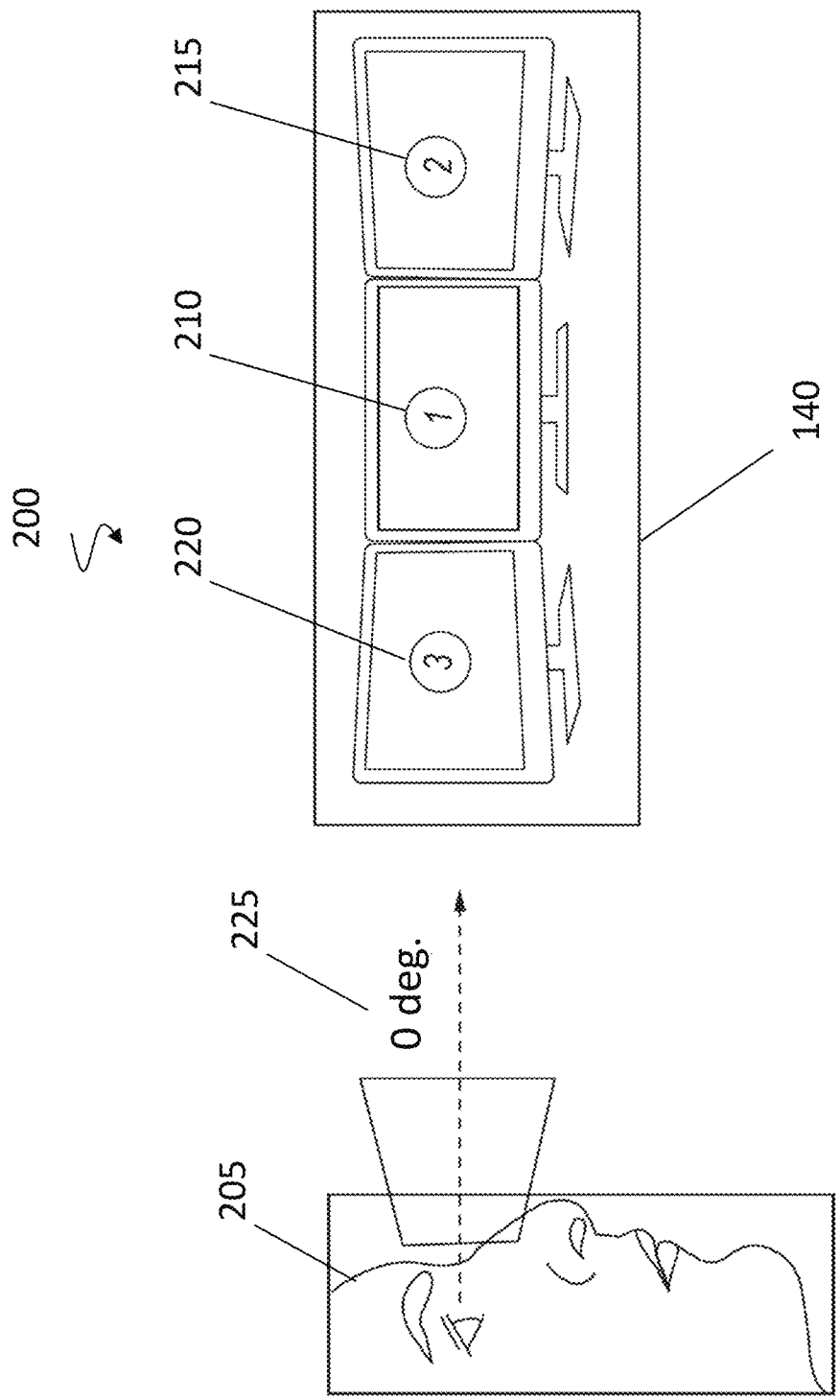
FIG. 2A-2D show a desktop sedentary virtual-reality system.

As discussed in more detail below, enhancements to the sedentary environment can be made to allow a user to maintain situational awareness, minimize the discomfort of virtual-reality environments, enable ease of content navigation, connect to real-world peripherals such as a keyboards and mice, and FIG. 2A-2D show a desktop sedentary virtual-reality system. FIG. 2A shows an initial setup of a sedentary virtual-reality system 200. User 205 is using a headset and can see sedentary environment display 140. Sedentary environment display 140 renders virtual monitor 210, virtual monitor 215, and virtual monitor 220. The user 205 can set the normal viewing mode. The normal viewing mode is also the virtual reality mode used for primary viewing in the sedentary environment. For example, if the person is lying down or the person is leaning his/her head, the normal viewing mode can be set to match that default position and thereafter measure relative positions based on the default positions. Once the default position is set, the headset sets the current viewing angle to zero degree 225. From the normal viewing mode, changes in user 205's position can switch the sedentary virtual-reality system 200 to augmented reality view or real-world view.

In augmented-reality viewing mode, a camera on a headset or mobile device captures the activity in front of user 205, which user 205 cannot see with her own eyes due to the headset, and sedentary environment display 140 renders the captured activity behind the virtual monitors 210 while disappearing monitors 215, and 220. Sedentary environment display 140 can also frost or blur the captured activity before rendering it to create a less-distracting abstraction behind virtual monitors 210. The rendering of the captured activity allows user 205 to see around her to prevent motion sickness and provide real world context awareness.

In real-world viewing mode, a camera on a headset or mobile device captures the activity below user 205 and towards the user 205's hands, which user 205 cannot see with her own eyes due to the headset, and sedentary environment display 140 renders the captured activity behind virtual monitor 210. The camera can capture images of user 205's hands and input devices on a desk or lap below user 205 and render user 205's hands along with the devices on sedentary environment display 140.

Switching between viewing modes can be accomplished by switching the position of the user's head. Alternatively, user 205 can maintain their position and use controls to switch to augmented reality view or real-world view. The controls can include buttons on the headset, voice commands, or devices such as keyboards and mice. Automatic switching. Detail gesture to transition back to reality.

Further, a camera on a headset or mobile device can capture and the headset or mobile device can analyze the captured images and detect any nearing objects to determine if there are any safety risks. The headset or mobile device can also analyze the captured images to determine if a person user 205 knows is approaching. The headset or mobile device can also use networking or other wireless technology to determine if mobile device owned by someone user 205 knows is approaching and then began capturing images to perform the facial detection. If there are safety risks or a known person approaching, the headset or mobile device can switch to augmented reality mode or real-world mode to allow user 205 to observe their surroundings without removing the headset. Alternatively, the headset or mobile device can provide an icon or other prompt to the user.

Figure 2B:
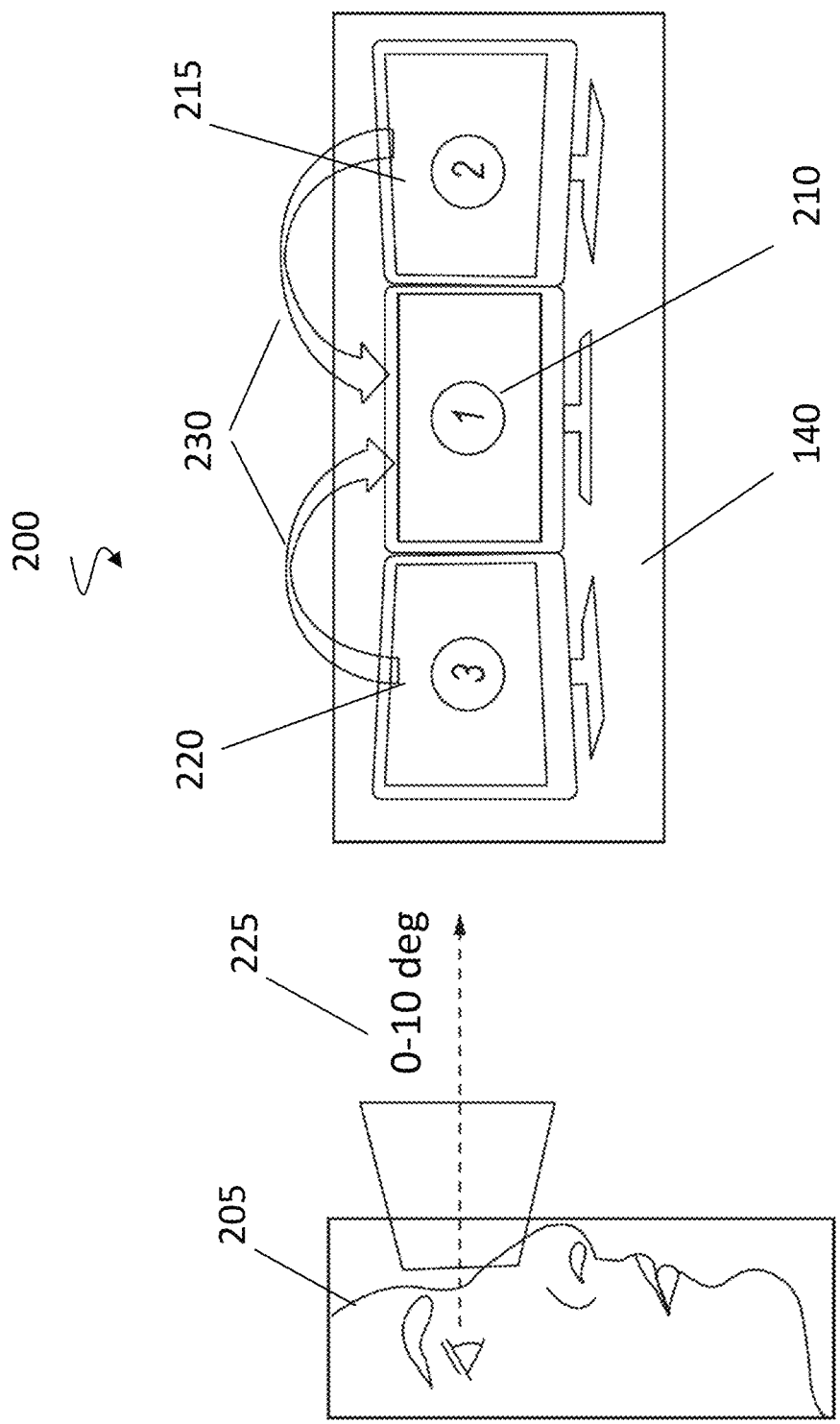

FIG. 2B shows the normal viewing mode and an angle used to maintain the sedentary virtual-reality system 200 in normal viewing mode. Virtual displays 210, 215, and 220 show content controlled by the user 205. Virtual displays 210, 215, and 220 can be separate, as depicted, or can be spliced together as one continuous display. When virtual displays 210, 215, and 220 are separate, they can support distinct workspaces (e.g. work, home, and entertainment). When virtual displays 210, 215, and 220 are used, they can allow for center display to be the active desktop. Allowing the center display to be the active desktop prevents neck and eye strain. Normal viewing mode can be maintained when the user 205 keeps her head within 10 degrees 225 of the default position. Arrows 230 indicate possible directions of view by a user.

Figure 2C:
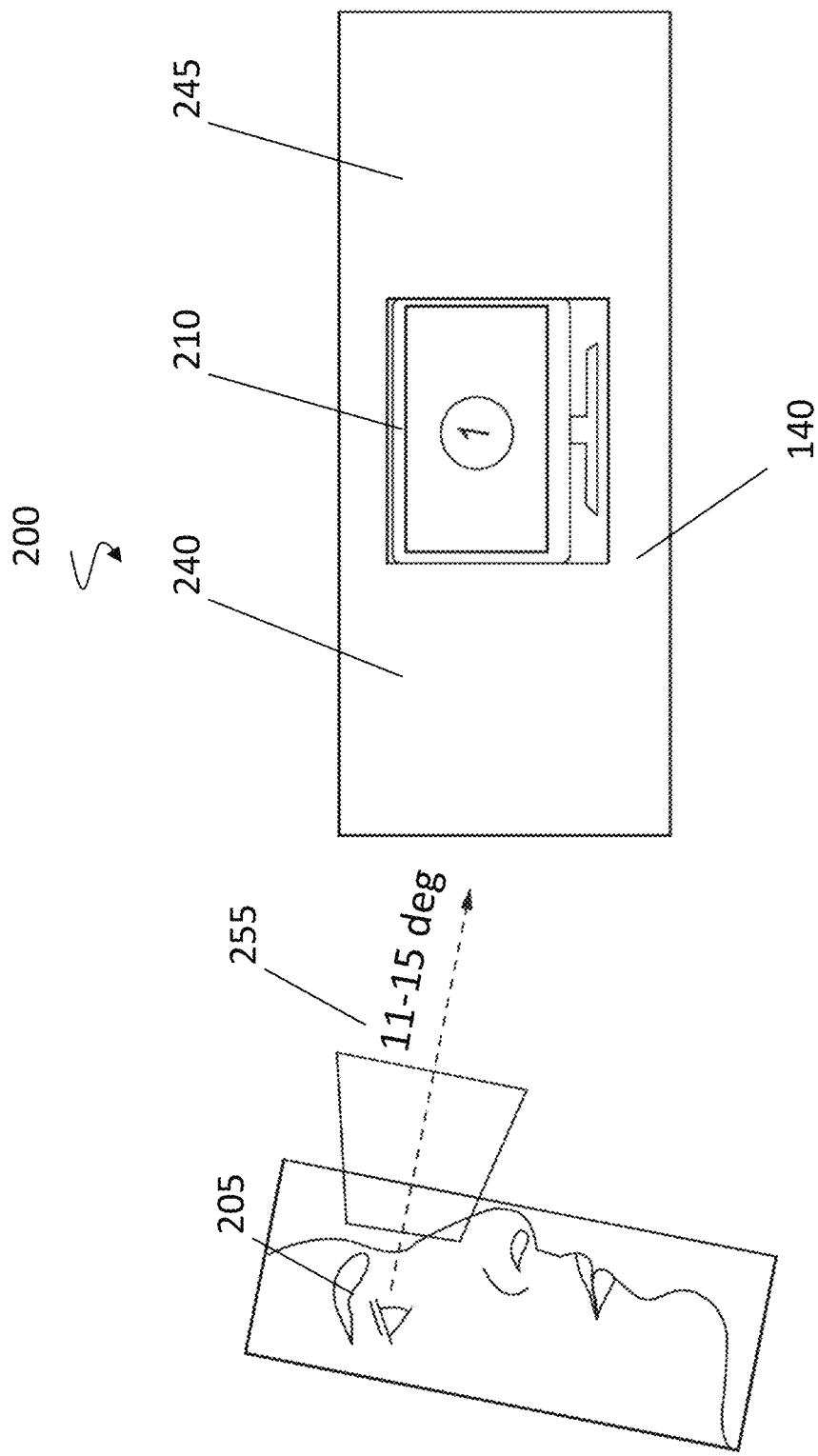

FIG. 2C shows the augmented-reality viewing mode and an angle used to maintain the sedentary virtual-reality system 200 in augmented-reality viewing mode. When user 205 tilts their head between ten degrees and fifteen degrees 255 down from the default position, the mobile device or headset can switch to augmented-reality viewing mode. In augmented-reality viewing mode, virtual displays 215 and 220 can disappear and sedentary environment display 140 can render the captured activity around virtual monitors 210, including into spaces 240 and 245 that virtual displays 215 and 220 once occupied. Sedentary environment display 140 can also frost or blur the captured activity before rendering it to create a less-distracting abstraction behind virtual monitors 210. The rendering of the captured activity can allow user 205 to see around her to prevent motion sickness and provide real-world contextual awareness. The center display can still be active and can be used by user 205. Augmented-reality viewing mode can be maintained when the user 205 keeps her head between 11 and 15 degrees 255 of the default position. If a user raises their head to less than 11 degrees of the default position, the sedentary virtual-reality system 200 can switch back to virtual-reality viewing mode.

In other implementations, virtual monitors 215 and/or 220 need not be disappeared. In yet other implementations, virtual monitors 210, 215, and 220 can be shrunk or spaced apart to allow greater real-world contextual awareness.

Figure 2D:
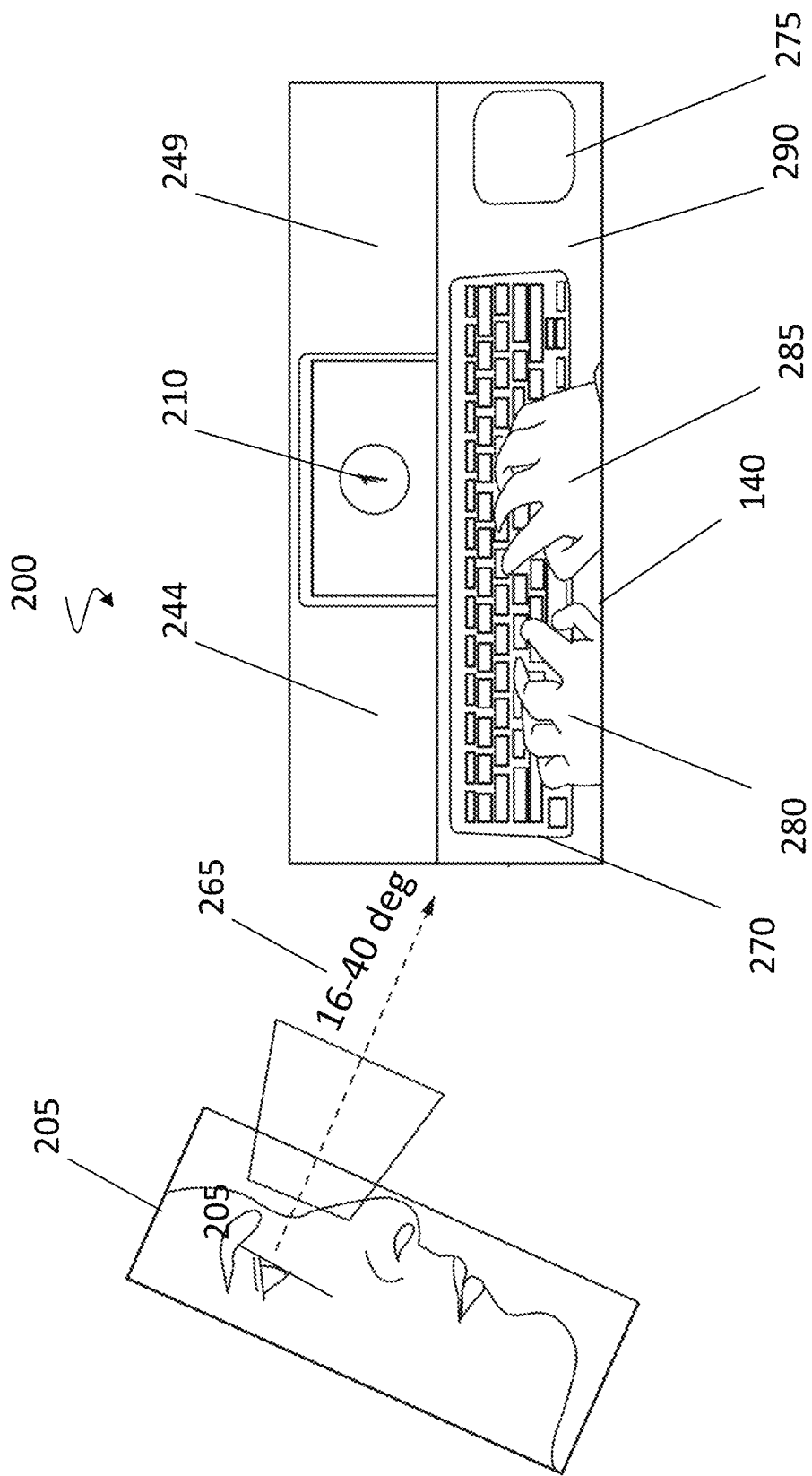

FIG. 2D shows the real-world viewing mode and an angle used to maintain the sedentary virtual-reality system 200 in real-world viewing mode. In real-world viewing mode, virtual displays 215 and 220 can disappear and sedentary environment display 140 can renders the captured activity around virtual monitors 210, including into spaces 244 and 249 that virtual displays 215 and 220 once occupied. The rendering of the captured activity can allow user 205 to see around her to prevent motion sickness and provide real world context awareness. The center display can still be active and can be used by user 205.

In real-world viewing mode, a camera on a headset or mobile device can capture the activity below user 205 and towards the user 205's hands, which user 205 cannot see with her own eyes due to the headset, and sedentary environment display 140 renders the captured activity behind virtual monitor 210. A user 205 can connect a mouse 275 or keyboard 270 to the sedentary virtual-reality system 200 to allow a user 205 to interact with the desktop input devices and control the sedentary virtual-reality system 200. The camera can capture images of user 205's hands 280 and 285, keyboard 270, mouse 275, and desk or lap 290. Sedentary virtual-reality system 200 can render user 205's hands 280 and 285, keyboard 270, mouse 275, and desk or lap 290 on display 140 so that the user can see how his hands are aligned. This can allow user 205 to locate keyboard 270 and mouse 275 relative to their hands. Mouse 275 and/or keyboard 270 can utilize various visual markers or communication systems (e.g. RFID, Bluetooth) to aid the sedentary virtual-reality system 200 in detecting their relative position.

Virtual control devices can also be used. Virtual keyboards can also be rendered and the camera can be used to track where user 205's fingers gesture. Likewise, gestures can be used to substitute for a pointing device, such as mouse 275, and the camera can be used to capture those gestures for analysis by the sedentary virtual-reality system 200.

Keyboard 270 can also include a pointing device to obviate the need for mouse 275 so that user 205 need not repeatedly look down to locate mouse 275. Alternatively, if the camera sense user 205 searching for mouse 275 while in another mode, sedentary virtual-reality system 200 can render a small picture-in-picture window that shows the mouse and the user's hand relative to the mouse while staying in that mode.

Real-world viewing mode can be maintained when the user 205 keeps her head between 16 and 40 degrees 265 of the default position. If a user raises their head to less than 16 degrees of the default position, the sedentary virtual-reality system 200 can switch back to augmented-reality viewing mode.

While angles for the use of each viewing system have been provided, other angles can be used. Angles can for each viewing mode can change depending on the environment and default position of the user. They can be adjusted by the user. For example, virtual keyboard using front camera would use real-world mode to see where fingers are typing using virtual key overlayed.

The sedentary virtual-reality system 200 can be implemented using head-mounted mobile device 105 and/or headset 160.

Figure 3:
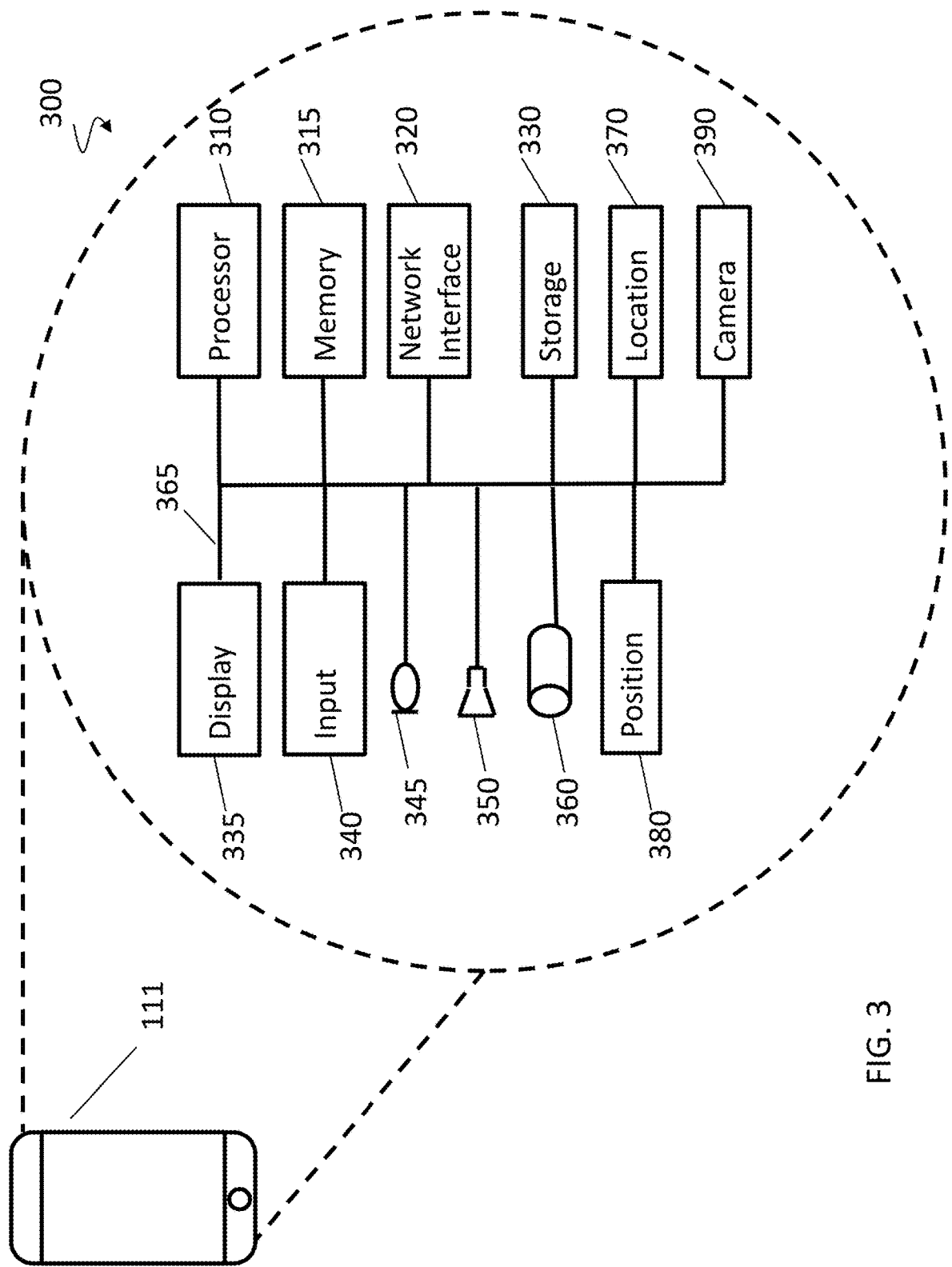
FIG. 3 shows a block diagram of a mobile device capable of creating sedentary virtual-reality systems.

FIG. 3 shows a block diagram of computer system 300 that can be used to create sedentary virtual-reality systems. Computer system 300 can be implemented inside mobile device 105. Computer system 300 can include bus 365 that connects the various components. Bus 365 can include one or more physical connections and can permit unidirectional or omnidirectional communication between two or more of the components in the computer system 300. Alternatively, components connected to bus 365 can be connected to computer system 300 through wireless technologies such as Bluetooth, Wifi, or cellular technology. The computer system 300 can include a microphone 345 for receiving sound and converting it to a digital audio signal. The microphone 345 can be coupled to bus 365, which can transfer the audio signal to one or more other components. Computer system 300 can include a headphone jack 360 for transmitting audio and data information to headphones and other audio devices.

An input 340 including one or more input devices also can be configured to receive instructions and information. For example, in some implementations input 340 can include a number of buttons. In some other implementations input 340 can include one or more of a mouse, a keyboard, a touch pad, a touch screen, a joystick, a cable interface, voice recognition, and any other such input devices known in the art. Further, audio and image signals also can be received by the computer system 300 through the input 340 and/or microphone 345. Input 340 can include a wireless remote control that can be used to control computer system 300 when it is in a head-mounted display.

Further, computer system 300 can include network interface 320. Network interface 320 can be wired or wireless. A wireless network interface 320 can include one or more radios for making one or more simultaneous communication connections (e.g., wireless, Bluetooth, low power Bluetooth, cellular systems, PCS systems, or satellite communications). A wired network interface 320 can be implemented using an Ethernet adapter or other wired infrastructure. Network interface 320 can be a mesh network, and can connect to wireless input devices such as mice and keyboards. Network interface 320 can also obtain relative-position information using network protocols to determine if input devices are located above, below, or to the side.

Computer system 300 may include a location sensor 370 to determine its geographic location. Location sensor 370 can include a GPS receiver. Alternatively, geographic location information can be programmed into memory 315 using input 340 or received via network interface 320. Location sensor 370 can be used to determine the relative position of input devices and other computer devices relative to computer system 300. Location sensor 370 can work on a smaller scale than GPS. Location sensor 370 can sense electronic tags on input devices to determine the relative position of the input devices and signal processor 100 to connect to such devices using network interface 320. Location sensor 370 can provide signal processor 100 with the relative position of such devices so processor 100 can render a virtual image of the device to the display 335.

An audio signal, image signal, video signal, user input, metadata, geographic information, user data, reproduction device, or modality information, other input or any portion or combination thereof, can be processed in the computer system 300 using the processor 310. Processor 310 can be used to perform analysis, processing, editing, playback functions, or to combine various signals, including processing audio, image, or video signals.

For example, processor 310 can be used to analyze the position of mobile device 111 to determine which viewing mode should be displayed. Once a viewing mode has been determined, processor 310 can determine which virtual-portions to render or disappear, and which augmented and/or real-world portions to render onto display 335. Processor 310 can also be used to process images captured by camera 390 and determine if objects are moving towards a user and the viewing mode needs to be changed, or if a known person is recognized and the user needs to be alerted. Processor 310 can perform computer vision for object detection, object boundary detection, or Optical character recognition to detect the QWERTY pattern of a keyboard or other input device.

Processor 310 can use memory 315 to aid in the processing of various signals, e.g., by storing intermediate results. Memory 315 can be volatile or non-volatile memory. Either or both of original and processed signals can be stored in memory 315 for processing or stored in storage 330 for persistent storage. Further, storage 330 can be integrated or removable storage such as Secure Digital, Secure Digital High Capacity, Memory Stick, USB memory, compact flash, xD Picture Card, or a hard drive.

Image signals accessible in computer system 300 can be presented on a display device 335, which can be an LCD display, LED display, OLED display, plasma display, or other display device. Display 335 also can display one or more user interfaces such as an input interface. The display can be driven to present two images to allow stereoscopic imaging.

The audio signals available in computer system 300 also can be presented through output 350. Output device 350 can be a speaker, multiple speakers, and/or speakers in combination with one or more haptic devices. Headphone jack 360 can also be used to communicate digital or analog information, including audio and sound profiles.

Computer system 300 can include positional sensor 380. Positional sensor 380 can be an electronic gyroscope or other device to measure the angle of computer system 300. For example, positional sensor 380 can tell if a user wearing a headset incorporating computer system 300 has tilted his head downwards or upwards. Positional sensor 380 can tell the degree that computer system 300 has been titled.

Camera 390 can be used to capture real world imagery. Camera 390 can be used in conjunction with processor 310 and network interface 320 to provide the relative location of input devices so they can be displayed in a virtual world. For example, when positional sensor 380 signals that computer system 300 is tilting downwards, camera 390 may provide images that processor 310 analyzes to identify input devices and connection information for those devices. Network interface 320 can then connect to the input devices. The images can also be used for process 100 to render virtual versions of the input devices for display in the virtual world.

Devices that are connected to computer system 300 can be integrated into a headset that accepts mobile device 105 as its display. For example, the devices that connect to input 340, such as buttons, can be integrated into the headset and used to control computer system 300.

Figure 4:
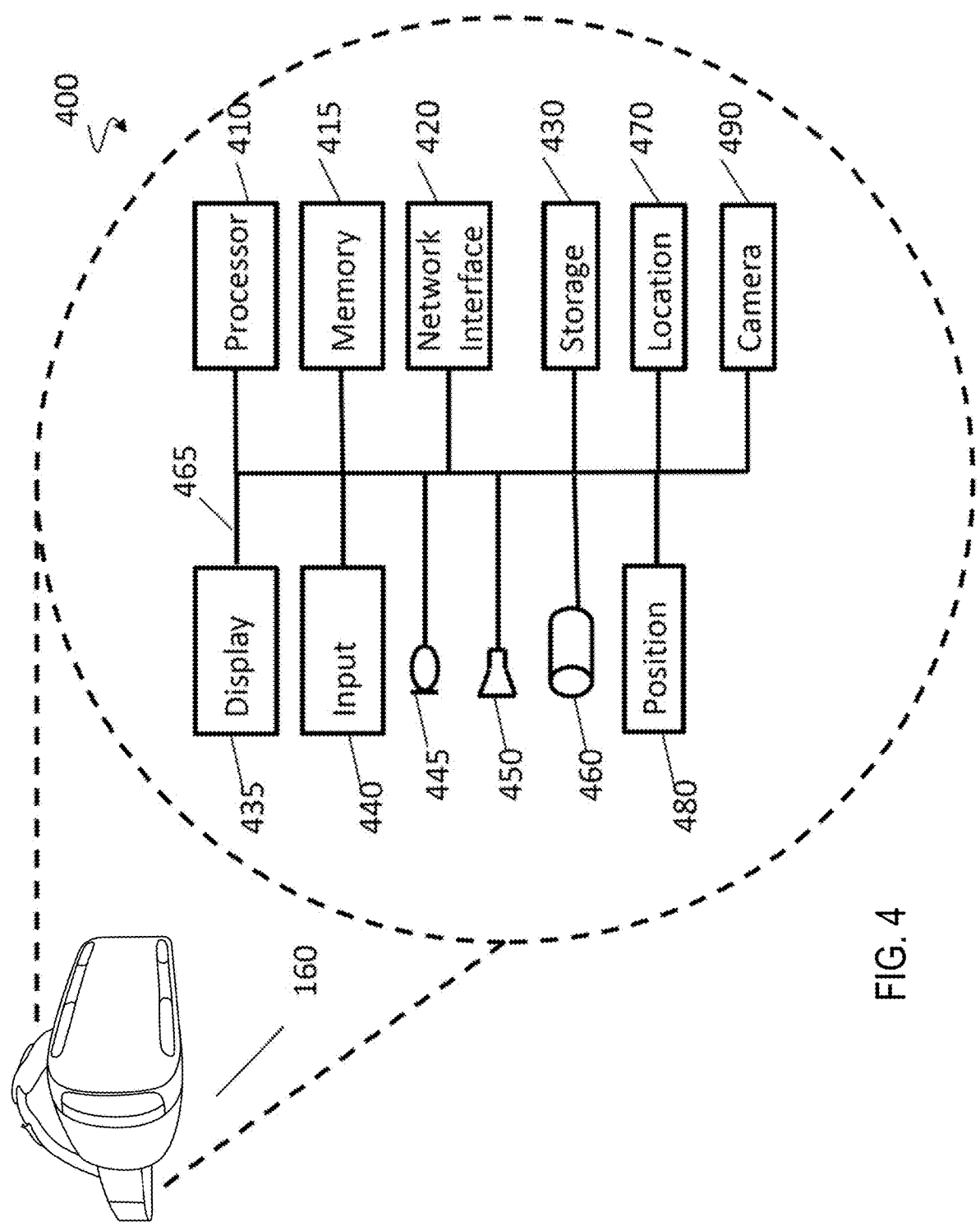
FIG. 4 shows a block diagram of a headset capable of creating sedentary virtual-reality systems.

FIG. 4 shows a block diagram of a headset capable of creating sedentary virtual-reality systems. Computer system 400 can be implemented inside headset 160. Computer system 400 can include bus 465 that connects the various components. Bus 465 can include one or more physical connections and can permit unidirectional or omnidirectional communication between two or more of the components in the computer system 400. Alternatively, components connected to bus 465 can be connected to computer system 400 through wireless technologies such as Bluetooth, Wifi, or cellular technology. The computer system 400 can include a microphone 445 for receiving sound and converting it to a digital audio signal. The microphone 445 can be coupled to bus 465, which can transfer the audio signal to one or more other components. Computer system 400 can include a headphone jack 460 for transmitting audio and data information to headphones and other audio devices.

An input 340 including one or more input devices also can be configured to receive instructions and information. For example, in some implementations input 440 can include a number of buttons. In some other implementations input 440 can include one or more of a mouse, a keyboard, a touch pad, a touch screen, a joystick, a cable interface, voice recognition, and any other such input devices known in the art. Further, audio and image signals also can be received by the computer system 400 through the input 440 and/or microphone 445. Input 440 can include a wireless remote control that can be used to control computer system 400 so the user does not need to touch computer system 400 directly.

Further, computer system 400 can include network interface 420. Network interface 420 can be wired or wireless. A wireless network interface 420 can include one or more radios for making one or more simultaneous communication connections (e.g., wireless, Bluetooth, low power Bluetooth, cellular systems, PCS systems, or satellite communications). A wired network interface 420 can be implemented using an Ethernet adapter or other wired infrastructure. Network interface 420 can be a mesh network, and can connect to wireless input devices such as mice and keyboards. Network interface 420 can also obtain relative-position information using network protocols to determine if input devices are located above, below, or to the side.

Computer system 400 may include a Location sensor 470 to determine its geographic location. Location sensor 470 can include a GPS receiver. Alternatively, geographic location information can be programmed into memory 415 using input 440 or received via network interface 420. Location sensor 470 can be used to determine the relative position of input devices and other computer devices relative to computer system 400. Location sensor 470 can work on a smaller scale than GPS. Location sensor 470 can sense electronic tags on input devices to determine the relative position of the input devices and signal processor 400 to connect to such devices using network interface 420. Location sensor 470 can provide signal processor 400 with the relative position of such devices so processor 400 can render a virtual image of the device to the display 435.

An audio signal, image signal, video signal, user input, metadata, geographic information, user data, reproduction device, or modality information, other input or any portion or combination thereof, can be processed in the computer system 400 using the processor 410. Processor 410 can be used to perform analysis, processing, editing, playback functions, or to combine various signals, including processing audio, image, or video signals.

For example, processor 410 can be used to analyze the position of mobile device 160 to determine which viewing mode should be displayed. Once a viewing mode has been determined, processor 410 can determine which virtual-portions to render or disappear, and which augmented and/or real-world portions to render onto display 435. Processor 410 can also be used to process images captured by camera 490 and determine if objects are moving towards a user and the viewing mode needs to be changed, or if a known person is recognized and the user needs to be alerted. Processor 410 can perform computer vision for object detection, object boundary detection, or Optical character recognition to detect the QWERTY pattern of a keyboard or other input device.

Processor 410 can use memory 415 to aid in the processing of various signals, e.g., by storing intermediate results. Memory 415 can be volatile or non-volatile memory. Either or both of original and processed signals can be stored in memory 415 for processing or stored in storage 430 for persistent storage. Further, storage 430 can be integrated or removable storage such as Secure Digital, Secure Digital High Capacity, Memory Stick, USB memory, compact flash, xD Picture Card, or a hard drive.

Image signals accessible in computer system 400 can be presented on a display device 435, which can be an LCD display, LED display, OLED display, plasma display, or other display device. Display 435 also can display one or more user interfaces such as an input interface. The display can be driven to present two images to allow stereoscopic imaging.

The audio signals available in computer system 400 also can be presented through output 450. Output device 450 can be a speaker, multiple speakers, and/or speakers in combination with one or more haptic devices. Headphone jack 460 can also be used to communicate digital or analog information, including audio and sound profiles.

Computer system 400 can include positional sensor 480. Positional sensor 480 can be an electronic gyroscope or other device to measure the angle of computer system 400. For example, positional sensor 480 can tell if a user of computer system 400 has tilted her head downwards or upwards. Positional sensor 480 can tell the degree that computer system 400 has been titled.

Camera 490 can be used to capture real world imagery. Camera 490 can be used in conjunction with processor 410 and network interface 420 to provide the relative location of input devices so they can be displayed in a virtual world. For example, when positional sensor 480 signals that computer system 400 is tilting downwards, camera 490 may provide images that processor 410 analyzes to identify input devices and connection information for those devices. Network interface 420 can then connect to the input devices. The images can also be used for process 400 to render virtual versions of the input devices for display in the virtual world. Camera 490 can include one or more camera sensors in various locations. For example, camera 490 can include a camera sensor on the bottom of headset 411 to better capture input devices, such as keyboards or mice, that may be on a desk below headset 411.

Figure 5:
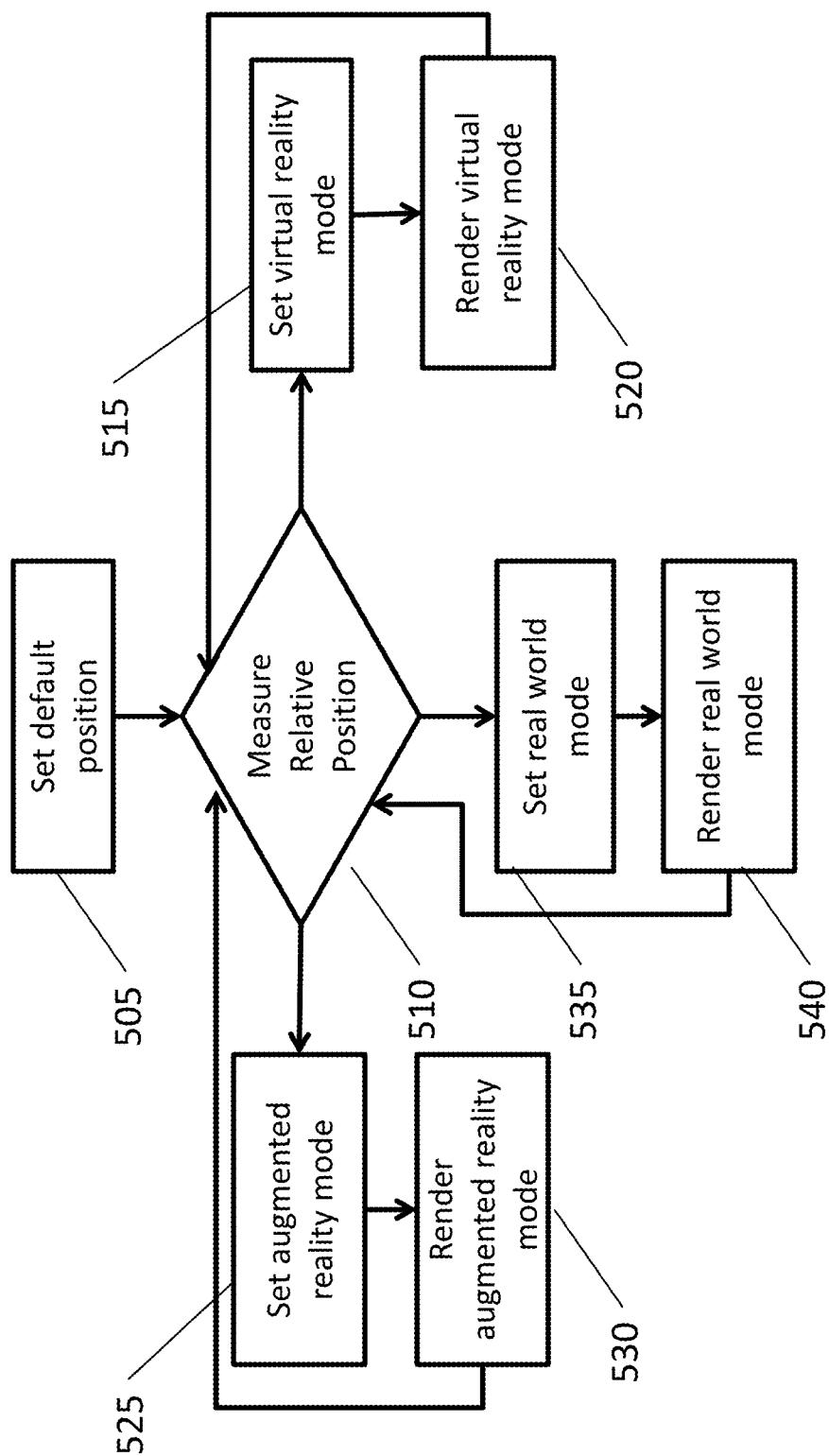
FIG. 5 shows steps for initializing and rendering a desktop sedentary virtual-reality system.

FIG. 5 shows steps for initializing and rendering a desktop sedentary virtual-reality system. Sedentary virtual-reality system can monitor user inputs to detect when a user sets a default position (505). When the default position is set, sedentary virtual-reality system can measure the relative position of the mobile device or headset (510). If the relative position is a first specific angle, sedentary virtual-reality system sets the viewing mode to virtual-reality viewing mode (515). Sedentary virtual-reality system then renders the virtual-reality viewing mode (520). Intermittently, while virtual-reality viewing mode is rendered (520), sedentary virtual-reality system measures the relative position (510) to make sure the user has not indicated a desire to change viewing modes. If the user has indicated a desire to change viewing modes, when sedentary virtual-reality system measures the relative position (510), it will detect a second specific angle and set the viewing mode to augmented-reality viewing mode (525). Sedentary virtual-reality system then renders the augmented-reality viewing mode (525). Intermittently, while augmented-reality viewing mode is rendered (525), sedentary virtual-reality system measures the relative position (510) to make sure the user has not indicated a desire to change viewing modes. If the user has indicated a desire to change viewing modes, when sedentary virtual-reality system measures the relative position (510), it will detect a third specific angle and set the viewing mode to real-world viewing mode (540). Sedentary virtual-reality system then renders the real-world viewing mode (520). Intermittently, while real-world viewing mode is rendered (540), sedentary virtual-reality system measures the relative position (510) to make sure the user has not indicated a desire to change viewing modes. If the user has indicated a desire to change viewing modes, when sedentary virtual-reality system measures the relative position (510), it will detect the first or third specific angle and set the viewing mode to either virtual-reality viewing mode (515) or augmented-reality viewing mode (525).

While rendering augmented-reality viewing mode (530), virtual-reality viewing mode (520), or real-world viewing mode (540), the sedentary virtual-reality system may detect a safety issue or a known person, and may switch to a different mode or a live camera feed to alert the user to the safety issue or known person.

FIGS. 3 and 4 show systems capable of performing these steps. The steps described in FIG. 5 need not be performed in the order recited and two or more steps can be performed in parallel or combined. In some implementations, other types of media also can be shared or manipulated, including audio or video.

Figure 6:
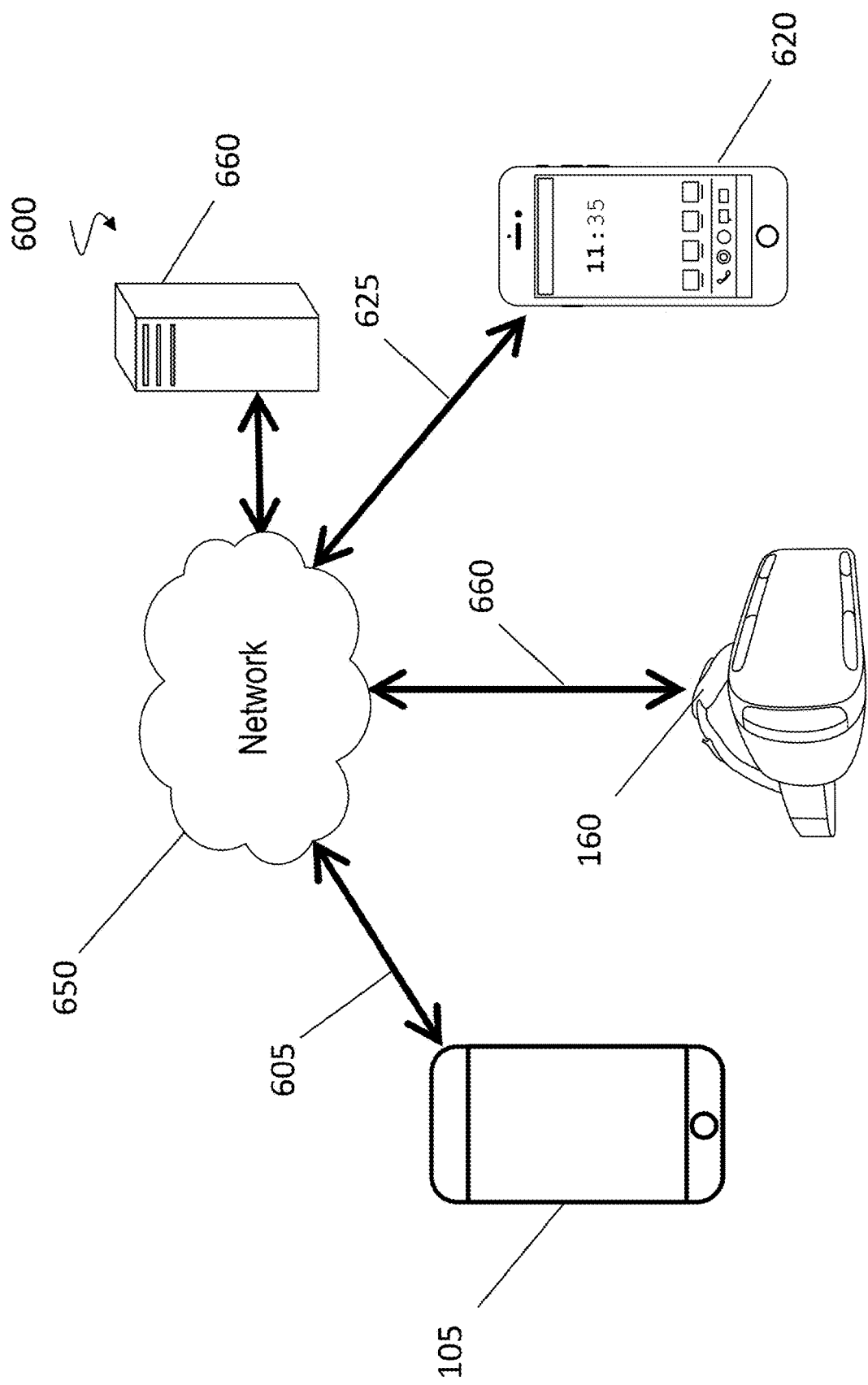
FIG. 6 shows a sedentary virtual-reality system in a sharing environment.

FIG. 6 shows a sedentary virtual-reality system in a sharing environment. Multiple devices can share all or parts of a view in sharing environment 600. Mobile device 105 can connect through connection 605 to network 650. Headset 660 can also connect to network 650 through connection 660. Similarly, mobile device 620 can connect to network 650 through connection 625. Connections 605, 660, and 625 can be wired or wireless. Network 650 can also connect to server 660. Network 650 can be the internet, a local network, or a peer-to-peer network created between the devices. Mobile device 105, headset 160, and mobile device 620 can also make direct connections to one another. The connections can allow the sharing of audio, video, and other data.

Mobile device 105, headset 160 and/or mobile device 620 can share all or part of a viewing mode. For example, if users of mobile device 105, headset 160 and/or mobile device 620 want to watch a video game together, one of the devices can render the video game and then share the rendered screen with the other devices. Similarly, if users of mobile device 105, headset 160 and/or mobile device 620 want to collaborate on editing a document, editing a spreadsheet, view photos, view videos, or screen share, one of the devices can render the video game and then share the rendered screen with the other devices. The information to be shared can be located, in the first instance, on server 660. Even while screen sharing, each individual user can still switch between virtual-reality viewing mode, augmented-reality viewing mode, and real-world viewing mode, and modify the received content to fit the viewing mode.

Alternatively, server 660 can take an active role in rendering the virtual-reality environment and then distribute the rendered environment to mobile device 105, headset 160 and/or mobile device 620. Server 660 can transcode content and format the content for the specific device and its display.

Server 660 can perform other computationally-intensive data manipulation. For example, if users of mobile device 105, headset 160 and/or mobile device 620 want to watch a video game together, server 660 can render the video game and then share the rendered screen with the devices. Similarly, if users of mobile device 105, headset 160 and/or mobile device 620 want to collaborate on editing a document, editing a spreadsheet, view photos, view videos, or screen share, server 660 can render the video game and then share the rendered screen with the other devices. Even while screen sharing, each individual user can still switch between virtual-reality viewing mode, augmented-reality viewing mode, and real-world viewing mode, and modify the received content to fit the viewing mode.

Mobile device 105, headset 160, and/or mobile device 620 can discovery other devices to share with using various strategies. For example, mobile device 105, headset 160, and/or mobile device 620 can search for devices in the local vicinity using Bluetooth or other networking and then verify whether the other device is a known device. Mobile device 105, headset 160, and/or mobile device 620 can use other social networks such as Facebook, LinkedIn, and/or twitter to identify other known users and their devices for sharing.

FIG. 7 shows a block diagram of a server capable of creating a social environment for a sedentary virtual-reality system.

FIG. 7 shows a block diagram of a computer system 700. Computer system 700 can be found in computer 600 and can be capable of performing the functions described in relation to FIG. 6. A subset of components in computer system 700 could also be used, and the components could be found in a PC, server, or cloud-based system. Bus 765 can include one or more physical connections and can permit unidirectional or omnidirectional communication between two or more of the components in the computer system 700. Alternatively, components connected to bus 765 can be connected to computer system 700 through wireless technologies such as Bluetooth, Wifi, or cellular technology. The computer system 700 can include a microphone 745 for receiving sound and converting it to a digital audio signal. The microphone 745 can be coupled to bus 765, which can transfer the audio signal to one or more other components. Computer system 700 can include a headphone jack 760 for transmitting audio and data information to headphones and other audio devices.

An input 740 including one or more input devices also can be configured to receive instructions and information. For example, in some implementations input 740 can include a number of buttons. In some other implementations input 740 can include one or more of a mouse, a keyboard, a touch pad, a touch screen, a joystick, a cable interface, voice recognition, and any other such input devices known in the art. Further, audio and image signals also can be received by the computer system 700 through the input 740.

Further, computer system 700 can include network interface 720. Network interface 720 can be wired or wireless. A wireless network interface 720 can include one or more radios for making one or more simultaneous communication connections (e.g., wireless, Bluetooth, low power Bluetooth, cellular systems, PCS systems, or satellite communications). A wired network interface 720 can be implemented using an Ethernet adapter or other wired infrastructure.

Computer system 700 includes a processor 710. Processor 710 can use memory 715 to aid in the processing of various signals, e.g., by storing intermediate results. Memory 715 can be volatile or non-volatile memory. Either or both of original and processed signals can be stored in memory 715 for processing or stored in storage 730 for persistent storage.

Further, storage 730 can be integrated or removable storage such as Secure Digital, Secure Digital High Capacity, Memory Stick, USB memory, compact flash, xD Picture Card, or a hard drive.

For example, processor 710 can be used to receiving the position of mobile device 111 to determine which viewing mode should be rendered. Once a viewing mode has been determined, processor 710 can determine which virtual-portions to render or disappear, and which augmented and/or real-world portions to render and distribute to other devices.

Image signals accessible in computer system 700 can be presented on a display device 735, which can be an LCD display, printer, projector, plasma display, or other display device. Display 735 also can display one or more user interfaces such as an input interface. The audio signals available in computer system 700 also can be presented through output 750. Output device 750 can be a speaker. Headphone jack 760 can also be used to communicate digital or analog information, including audio and sound profiles.

In addition to being capable of performing virtually all of the same kinds of analysis, processing, parsing, editing, and playback tasks as computer system 300 described above, computer system 700 is also capable of maintaining a database of users, either in storage 730 or across additional networked storage devices. This type of database can be useful, for example, to operate a streaming service, or other type of store where documents or multimedia can be distributed. Within the user database, each user is assigned some sort of unique identifier. Whether provided to computer system 700 using input 740 or by transmissions over network interface 720, various data regarding each user can be associated with that user's identifier in the database, including demographic information, geographic information, and information regarding reproduction devices and consumption modalities. Processor 710 is capable of analyzing such data associated with a given user and extrapolate from it the user's likely preferences when it comes to rendering. For example, processor 710 may receive information regarding the mobile device's screen, and may store this information and use it to render the display screens. These user rendering preferences can be stored in the database for later retrieval and use.

In addition to the user database, computer system 700 is capable of maintaining a collection of documents, either in storage 1330 or across additional networked storage devices. For example, the documents can be video games, word processing documents, spreadsheets, photos, videos, or websites. The information to be shared can be located, in the first instance, on server 660.

FIG. 8 shows steps for using a sedentary virtual-reality system in a sharing environment. Sedentary virtual-reality system or a server, acting as the source device, can monitor its connections until it detects another device for sharing (805). When another device is detected, the other devices can self-identify (810) and the source device can determine if it wishes to share with the other devices. The source device, with the help of user input, can determine which content to share (820). The content can be rendered locally at the source device (830). The content can then be rendered for sharing (840). Rendering for sharing can include reformatting the content to accommodate the display of the receiving device. The rendered content is then shared with the other devices (850). The steps may be performed so multiple devices share content.

FIGS. 3, 4, and 7 shows systems capable of performing these steps. The steps described in FIG. 8 need not be performed in the order recited and two or more steps can be performed in parallel or combined. In some implementations, other types of media also can be shared or manipulated, including audio or video.

Figure 9A:
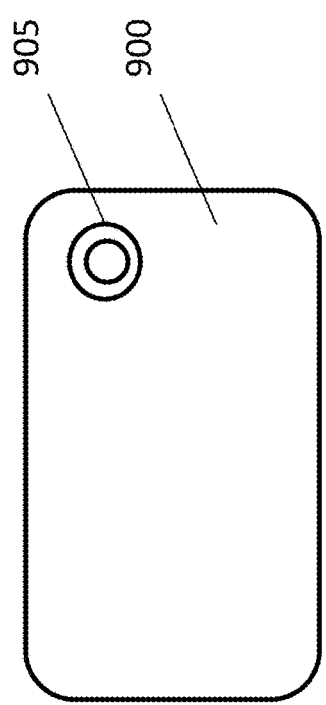
FIG. 9A-9C show enhanced mobile devices for use in creating sedentary virtual-reality systems.
Figure 9B:
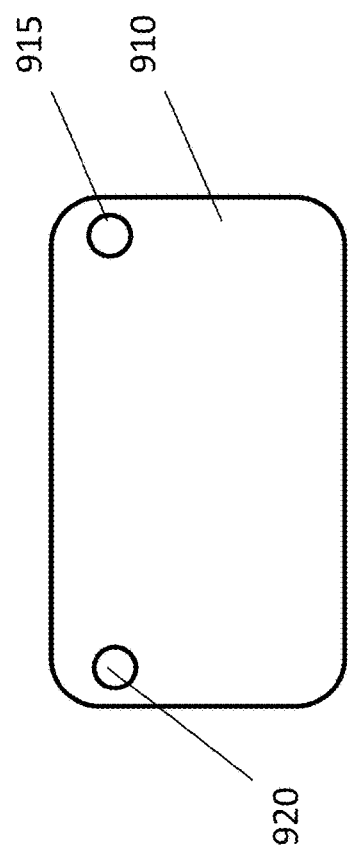
Figure 9C:
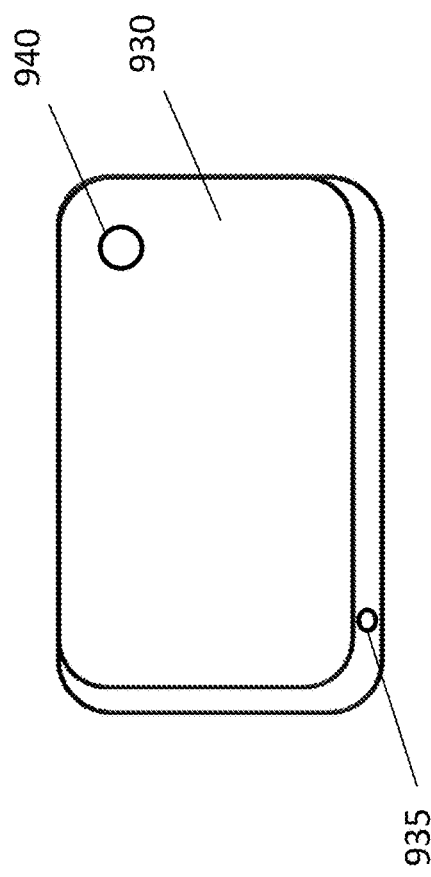

FIG. 9A-9C show enhanced mobile devices for use in creating sedentary virtual-reality systems. Mobile device 900 can include enhancements to further enable a sedentary virtual-reality system. Mobile device 900 can include wide-angle camera 905. Wide-angle camera 905 can allow mobile device 900 to capture a larger portion of the surroundings to provide greater situational awareness. Wide-angle camera 905 can have a fish-eye lens that allows for an even wider angle. Wide-angle camera 905 can allow mobile device 900 to capture images of the user's hands, a keyboard, or a mouse while allowing the user to tilt their head less to bring the user's hands, keyboard, or mouse into view. Images from wide-angle camera 905 can be processed using the devices disclosed above in FIGS. 3 and 4 to render flat images for use in the augmented-reality viewing mode, and the real-world viewing mode.

Mobile device 910 can include left camera 915 and right camera 920. Left camera 915, and right camera 920 can be used to create stereoscopic images that can be captured and processed using the devices disclosed above in FIGS. 3 and 4 to render stereoscopic images in the augmented-reality viewing mode, and the real-world viewing mode. Stereoscopic images can also be used by the processor 310 or processor 410 to determine if an object is moving towards the user. Camera 390 or 490 can include stereoscopic camera sensors to aid in creating stereoscopic images. Camera 390 or 490 can also include a camera pointing behind the user for capturing events behind the user and for use in alerting the user to those events.

Mobile device 930 can include a bottom camera 935 in addition to camera 940. Bottom camera 935 can allow mobile device 930 to capture images of the user's hands, a keyboard, or a mouse while allowing the user to tilt their head less to bring the user's hands, keyboard, or mouse into view. Bottom camera 935 can be of lower resolution. Bottom camera 935 can also be used to enable picture-in-picture mode when a user appears to be trying to locate a keyboard or a mouse as discussed above.

Figure 10:
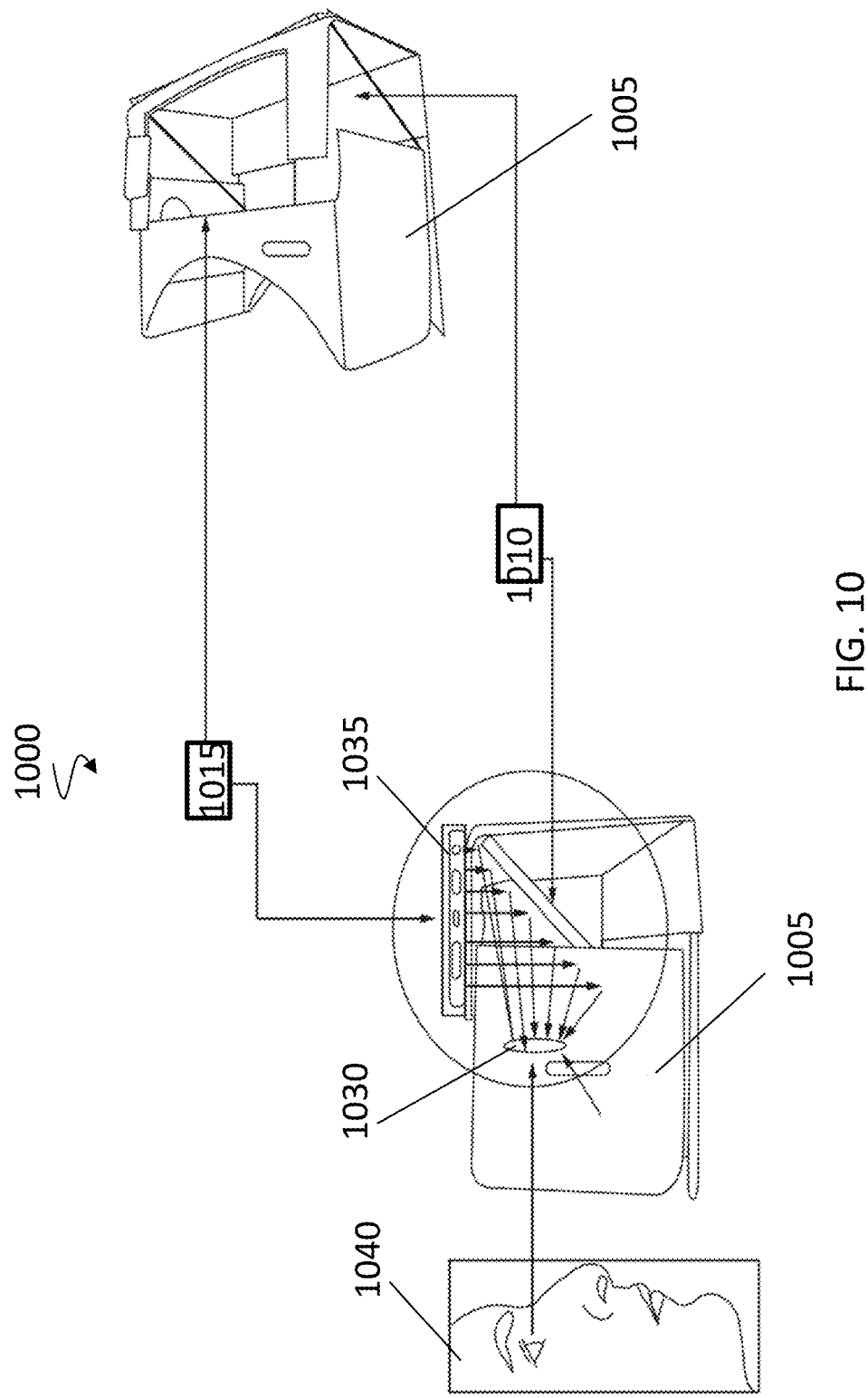
FIG. 10 shows an enhanced headset for use in creating sedentary virtual-reality systems.

FIG. 10 shows an enhanced headset for use in creating sedentary virtual-reality systems. The use environment 1000, shows a user's position relative to the headset. FIG. 10 shows two views of a headset that allows the mobile device to be placed on the top of the unit, instead of in the front of the unit. Headset 1005 can hold mobile device 1035 on the top of headset 1005 using a clear piece of material 1015. The display of headset 1005 (not shown) faces down towards screen 1010. Screen 1010 reflects the light emitted from the display into lens 1030, which is then viewed by user 1040. Screen 1010 can be partially or completely transparent. Screen 1010 can allow the real-world to be viewed through the screen 1010 with the images from the display of headset 1005 overlaid on top of the real world view. Forward imaging for mobile device 1035 can be handle using a bottom camera in device 1035 or via a reflector attached to the backside of mobile device 1035.

Figure 11A:
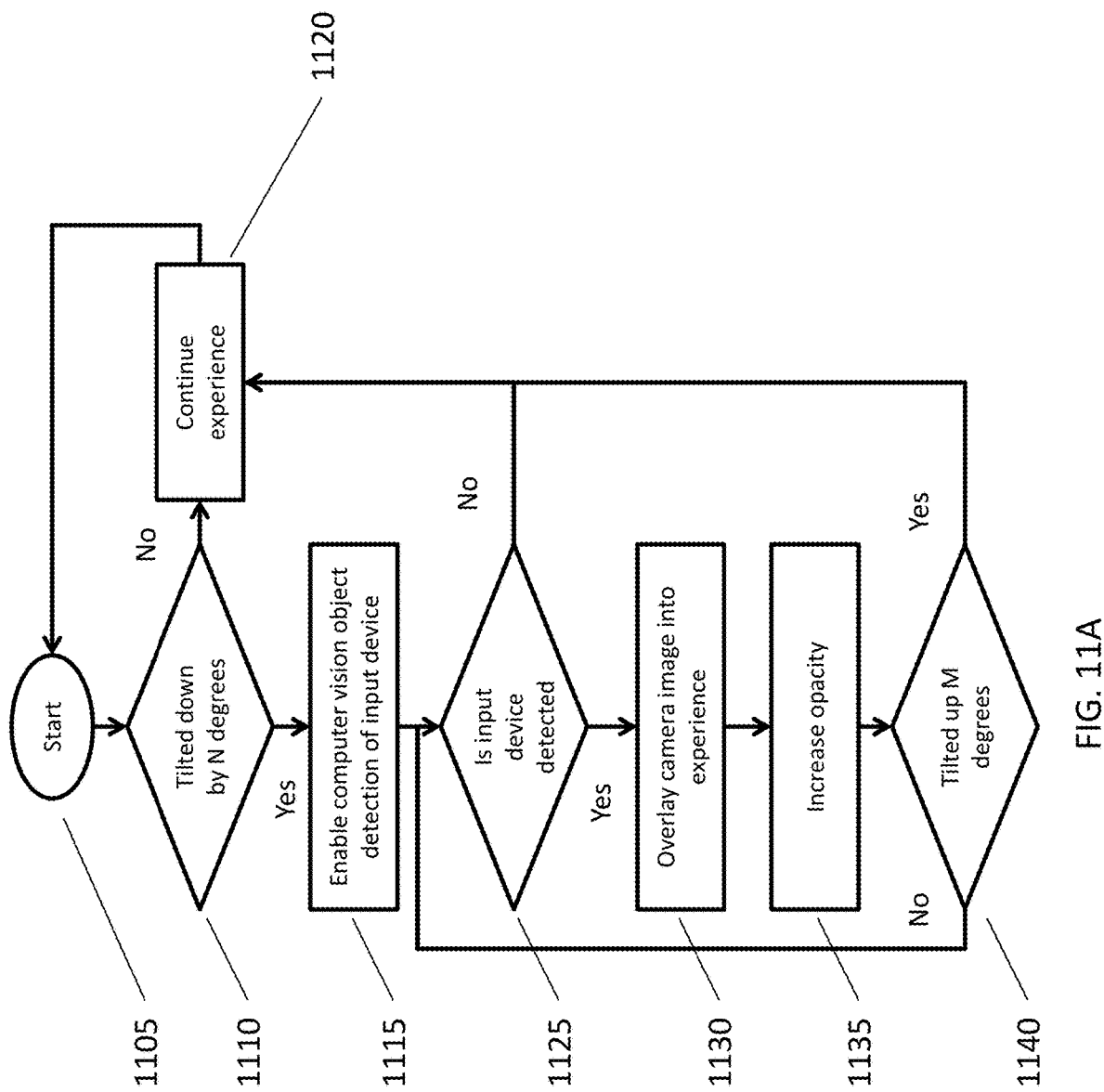
FIGS. 11A-C show steps for input device detection in sedentary virtual-reality systems.
Figure 11B:
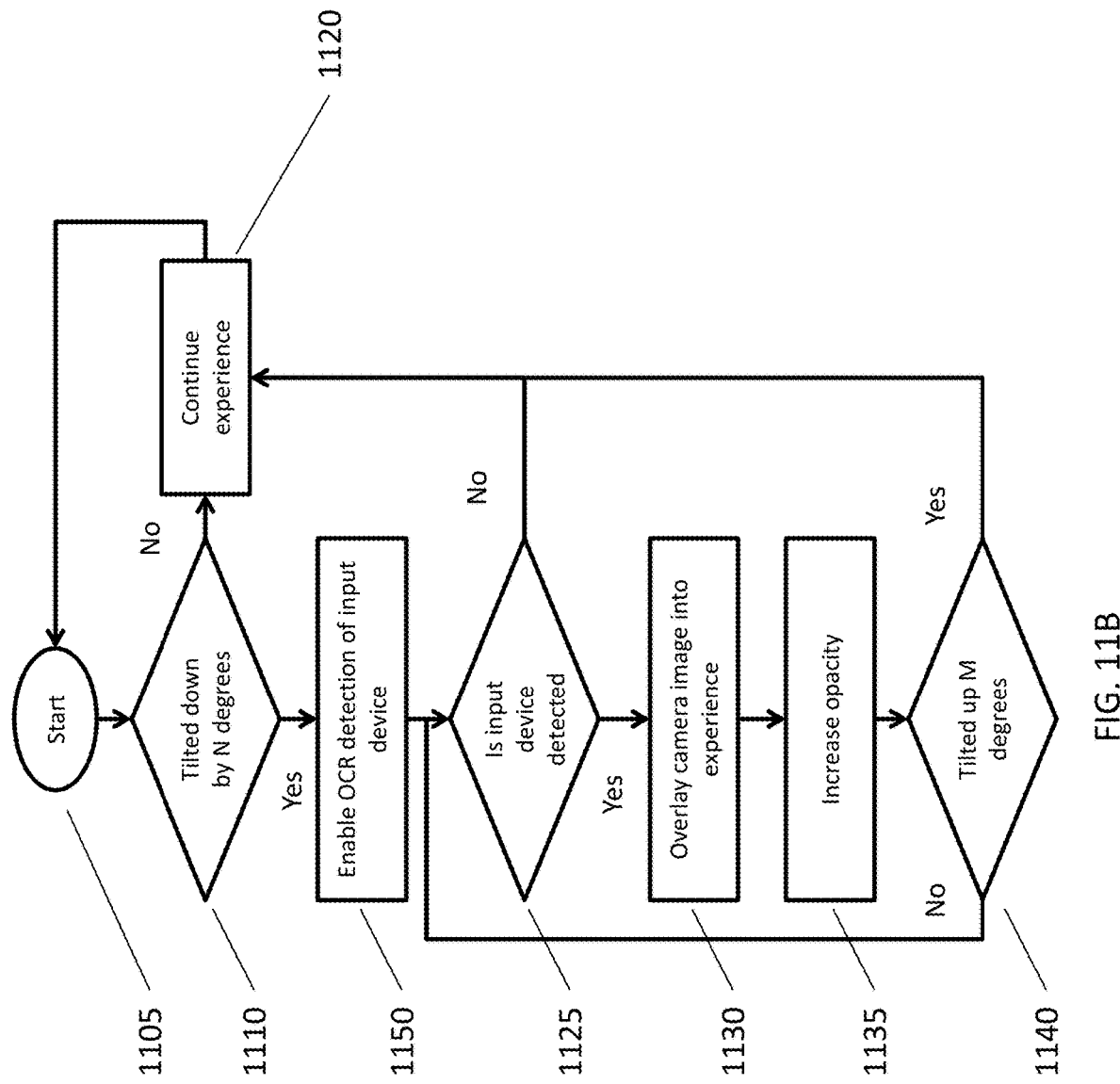
Figure 11C:
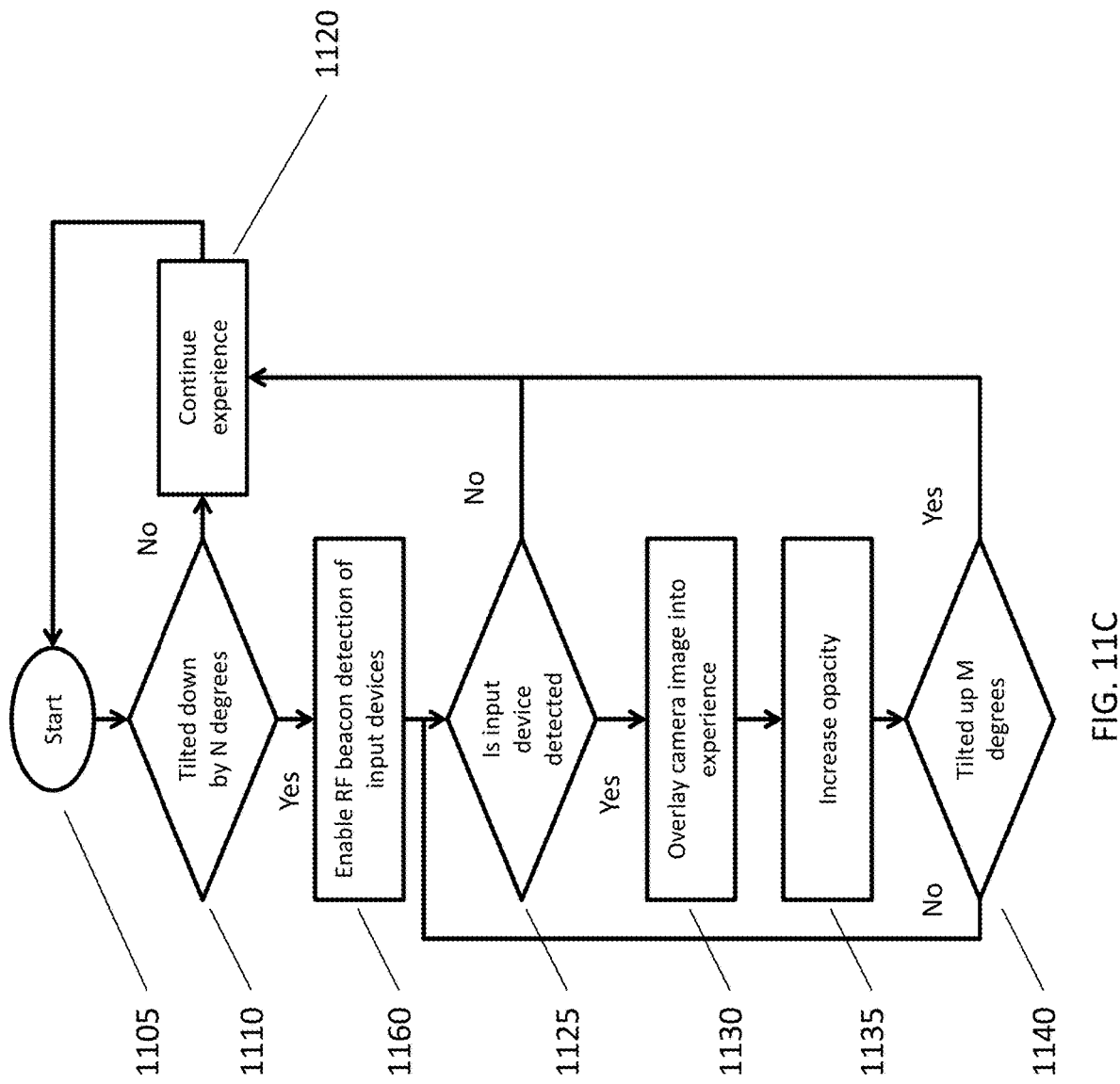

FIGS. 11A-C show steps for input device detection in sedentary virtual-reality systems. As described above, sedentary virtual-reality system can monitor user inputs and the mobile device or headset are monitored (1105) to detect when a user sets a default position. Sedentary virtual-reality system can measure the relative position of the mobile device or headset to detect if the mobile device or headset has been titled down by N degrees. The number of degrees can depend on the distance between the user and the input device. For example, if the input device is closer to the user, the degree can be greater. The mobile device or headset can record prior usage scenarios, the distances between the input device and the user, the geography, and use the prior settings to determine N. For example, if when the user is at their work desk, the keyboard is closer to the user, the mobile device or headset can require a higher N the next time the user is at her desk. N can also be greater than the degree of tilt required to switch use modes. The mobile device or headset can evaluate N (1110). If the mobile device or headset is not tiled down by N degrees, the prior usage mode continues (1120), no new input device is detected or connected, and user inputs and the mobile device or headset are monitored (1105). If the mobile device or headset is titled down by N degrees, the mobile device or headset enables computer vision object detection to monitor the camera feed and detect an input device (1115). The computer vision object detection can be enhanced by using known parameters for various input devices. For example, the computer vision object detection can look for rectangles to identify a keyboard. If the input device is not detected (1125), the prior usage mode continues (1120). If the input device is detected, the camera feed can be overlaid into the experience (1130) such that the user sees the input device. Alternative arrangements are also possible. An icon can be used, instead of a live image. The camera feed can be adjusted in size before being overlaid. The camera feed can be placed side-by-side, rather than overlaid. The opacity of the camera overlay can also be gradually increased (1135) to smooth the blending of the camera overlay into the display. If the user has located the input device, the user can tilt their head up M degrees (1140), the prior usage mode continues (1120). If the input device is not connected, the search continues until the input device is detected (1125) or the user titles their head up M degrees (1140). M degrees can be the same as N degrees, but may vary.

As an alternative to the mobile device or headset enabling computer vision object detection to monitor the camera feed and detect an input device (1115), the mobile device or headset can enable Optical Character Recognition (OCR) detection (1150) to detect an input device as show in FIG. 11B. The OCR detection can search for QWERTY lettering on a potential keyboard or known brand labels of input device manufacturers. The other steps in 11B mirror those in 11A. As another alternative to the mobile device or headset enabling computer vision object detection to monitor the camera feed and detect an input device (1115), the mobile device or headset can enable Radio Frequency (RF) detection (1160) to detect an input device as show in FIG. 11C. The other steps in 11B mirror those in 11A. The mobile device or headset can use combinations of computer vision object detection, OCR detection, and/or RF detection to identify input devices.

FIGS. 3 and 4 show systems capable of performing the steps depicted in FIGS. 11A-C. The steps described in FIGS. 11A-C need not be performed in the order recited and two or more steps can be performed in parallel or combined. In some implementations, other types of media also can be shared or manipulated, including audio or video.

A number of examples of implementations have been disclosed herein. Other implementations are possible based on what is disclosed and illustrated.

We claim:

1. A device for creating a sedentary virtual-reality system, comprising:
   a display with a plurality of pixels;
   a mounting apparatus configured to attach the display to a user's head and position the display in front of a user's eyes;
   a position sensor capable of detecting an angle of use of the display;
   a camera capable of capturing live images;
   a memory component capable of storing electronic information;
   one or more computer processors, communicatively coupled to the display, position sensor, memory component, and camera, and configured to analyze a default angle of the device and a first angle of the device and determine a first viewing mode for using the device;
   wherein the first viewing mode is a virtual-reality viewing mode and the one or more processors render a document for collaborative editing with one or more other devices and a completely rendered background behind the one or more horizontally-placed monitors that are displayed on the display when in the virtual-reality viewing mode;
   wherein the one or more computer processors, communicatively coupled to the display, position sensor, memory component, and camera, are further configured to analyze a second angle of the device and determine a second viewing mode for using the device;
   wherein the second viewing mode is a real-world mode where images, captured by the camera in real time, are displayed on the display.

2. The device of claim 1, wherein:
   the one or more computer processors, communicatively coupled to the display, position sensor, memory component, and camera, are further configured to analyze a third angle of the device and determine a third viewing mode for using the device; and
   wherein the third viewing mode is an augmented-reality viewing mode and the one or more processors render a composite image, comprised of two or fewer monitors and a background behind the two or fewer monitors comprised of images captured by the camera in real-time and obscured by the one or more processors, that are then displayed on the display when in the augmented-reality viewing mode.

3. The device of claim 1, further comprising:
   a networking interface communicatively coupled to the one or more computer processors;
   wherein the one or more computer processors, communicatively coupled to the display, position sensor, cameras, memory component, and networking interface are further configured to detect an input device when in the second angle range and connect with an input device through the networking interface when the input device is detected by the one or more computer processors.

4. The device of claim 2, further comprising:
   a networking interface communicatively coupled to the one or more computer processors;
   wherein the one or more computer processors has determined the second or third viewing mode for using the device; and
   wherein the one or more computer processors, communicatively coupled to the display, memory component, and camera, are further configured to perform radio frequency detection, and connect with an input device through the networking interface when the input device is detected by the one or more computer processors.

5. The device of claim 2, further comprising:
   a networking interface communicatively coupled to the one or more computer processors;

wherein the one or more computer processors has determined the second or third viewing mode for using the device; and wherein the one or more computer processors, communicatively coupled to the display, memory component, and camera, are further configured to analyze one or more images captured by the camera and perform computer vision detection on the one or more images captured by the camera, and connect with an input device through the networking interface when the input device is detected by the one or more computer processors.

6. The device of claim 2, further comprising:

a networking interface communicatively coupled to the one or more computer processors;

wherein the one or more computer processors has determined the second or third viewing mode for using the device; and wherein the one or more computer processors, communicatively coupled to the display, memory component, and camera, are further configured to analyze one or more images captured by the camera and perform optical character recognition detection on the one or more images captured by the camera, and connect with an input device through the networking interface when the input device is detected by the one or more computer processors.

7. The device of claim 1, wherein the display, the position sensor, the camera, the memory component, and the one or more computer processors are contained within a mobile device.

8. The device of claim 1, wherein the display, the position sensor, and the camera are contained within a headset.

9. The device of claim 1, further comprising:

a networking interface communicatively coupled to the one or more computer processors;

wherein the one or more computer processors, communicatively coupled to the display, position sensor, memory component, and camera, are further configured to detect one or more devices capable of sharing content; and wherein the one or more computer processors, communicatively coupled to the display, memory component, and camera, are further configured to render virtual-reality content to share with the one or more devices capable of sharing.

10. The device of claim 1, wherein the display is partitioned into a left-eye viewing area and a right-eye viewing area that each display different images.

11. The device of claim 1, wherein the default angle of the device can be set by a user when the user is lying down.

12. A device for creating a sedentary virtual-reality system, comprising:

a display with a plurality of pixels;

a position sensor capable of detecting an angle of use of the display;

a camera capable of capturing live images;

a memory component capable of storing electronic information;

a networking interface capable of wirelessly communicating with other devices;

one or more computer processors, communicatively coupled to the display, position sensor, cameras, memory component, and networking interface;

wherein the display, position sensor, camera, memory component, networking interface, and one or more computer processors are contained within a mobile device;

a mounting apparatus configured to hold the mobile device position display in front of a user's eyes;

wherein, the one or more computer processors are configured to receive information comprising an angle of use of the display from the position sensor, analyze the angle of use of the display, and determine if the angle of use of the display is between a first angle range or second angle range;

wherein the first angle range corresponds to a first viewing mode and the one or more processors render a document for collaborative editing with one or more other devices that is displayed on the display when in the first viewing mode; and wherein the second angle range corresponds to a second viewing mode and the one or more processors render one or more images, comprising images captured by the camera, that are displayed on the display in the second viewing mode.

13. The device of claim 12, wherein the one or more computer processors, communicatively coupled to the display, position sensor, cameras, memory component, and networking interface are further configured to detect an input device when in the second angle range and connect with an input device through the networking interface when the input device is detected by the one or more computer processors.

14. The device of claim 12, wherein:

the one or more computer processors, communicatively coupled to the display, position sensor, memory component, and camera, are further configured to analyze a third angle of the device and determine a third viewing mode for using the device; and wherein the third viewing mode is a real-world mode where images, captured by the camera in real time, are displayed on the display.

15. The device of claim 12, wherein the display is partitioned into a left-eye viewing area and a right-eye viewing area that each display different images.

16. A device for creating a sedentary augmented-reality system, comprising:

a display with a plurality of pixels;

a mounting apparatus configured to attach the display to a user's head and position the display in front of a user's eyes;

a position sensor capable of detecting an angle of use of the display;

a camera capable of capturing live images;

a memory component capable of storing electronic information;

one or more computer processors, communicatively coupled to the display, position sensor, memory component, and camera, and configured to analyze a first angle of the device and determine a first viewing mode for using the device;

wherein the first viewing mode is an augmented-reality viewing mode and the one or more processors render a composite image, comprised of rendered images and images captured by the camera in real-time, that are then displayed on the display when in the augmented-reality viewing mode;

wherein a document for collaborative editing is with one or more other devices is rendered in the first viewing mode; and the one or more computer processors, communicatively coupled to the display, position sensor, memory component, and camera, are further configured to analyze a second angle of the device and determine a second viewing mode for using the device;

wherein the second viewing mode is a real-world mode where images, captured by the camera in real time are displayed on the display.

17. The device of claim 16, further comprising:

a networking interface communicatively coupled to the one or more computer processors;

wherein the one or more computer processors has determined the second viewing mode for using the device; and wherein the one or more computer processors, communicatively coupled to the display, position sensor, memory component, and camera, are further configured to connect with an input device through the networking interface when the input device is detected by the one or more computer processors.

18. The device of claim 16, wherein:

the one or more computer processors, communicatively coupled to the display, position sensor, memory component, and camera, are further configured to analyze a third angle of the device and determine a third viewing mode for using the device; and wherein the third viewing mode is a virtual-reality viewing mode and the one or more processors completely render images that are displayed on the display when in the virtual-reality viewing mode.

19. The device of claim 16, wherein the display, the position sensor, the camera, the memory component, and the one or more computer processors are contained within a mobile device.

20. The device of claim 16, wherein the display, the position sensor, and the camera are contained within a headset.

* * * * *